United States Patent [19]

Morrison

[11] Patent Number: 5,407,603
[45] Date of Patent: Apr. 18, 1995

[54] VANADIUM OXIDE COLLOIDAL DISPERSONS AND ANTISTATIC COATINGS

[75] Inventor: Eric D. Morrison, West St. Paul, Minn.

[73] Assignee: Minnesota Mining and Manufacturing Company, St. Paul, Minn.

[21] Appl. No.: 253,194

[22] Filed: Jun. 2, 1994

Related U.S. Application Data

[63] Continuation of Ser. No. 72,548, Jun. 4, 1993, abandoned, which is a continuation-in-part of Ser. No. 893,504, Jun. 4, 1992, abandoned.

[51] Int. Cl.$^6$ .................. H01B 1/06; C01G 31/02; C09D 5/24
[52] U.S. Cl. .................. 252/518; 106/286.1; 106/287.18; 423/69; 423/65; 423/66; 423/592
[58] Field of Search .................. 252/518; 106/286.1, 106/287.18; 423/64, 65, 66, 592

[56] References Cited

U.S. PATENT DOCUMENTS

| | | | |
|---|---|---|---|
| 4,203,769 | 5/1980 | Guestaux | 430/631 |
| 4,642,136 | 2/1987 | Fukushima et al. | 252/512 |
| 5,006,451 | 4/1991 | Anderson et al. | 430/527 |

FOREIGN PATENT DOCUMENTS

| | | | |
|---|---|---|---|
| 4125758A1 | 2/1993 | Germany | B05D 5/12 |
| 2032405 | 5/1980 | United Kingdom | C01G 31/02 |
| WO93/06043 | 4/1993 | WIPO | C01B 31/02 |

OTHER PUBLICATIONS

"A Sol-Gel Route to Composite Positive Electrodes for Lithium Cells with Polymer Electrolytes", M. G. Minett and J. R. Owen, *Journal of Power Sources*, 28 (1989), pp. 397–408, (no month aval.).
Japanese Abstract No. J-62030619 A (Feb. 1987).
Japanese Abstract No. J-01294306 A (Nov. 1989).
"Electric Moments of the Simple Alkyl Orthovanadates," Cartan et al., *J. Phys. Chem.*, 64 (1960), pp. 1756–1758, (no month avail.).
"Mixed-Valence Polyvanadic Acid Gels", Gharbi et al., *Inorg. Chem.*, 21, (1982), pp. 2758–2765, (no month avail.).
"Synthesis of Amorphous Vanadium Oxide from Metal Alkoxide", Hioki et al., *Nippon Seramikkusu Kyokai Gakujutsu Ronbunshi*, 97, (6), (1989), pp. 628–633 (no month avail.).
"Synthesis of $V_2O_3$ Gels from Vanadyl Alkoxides", Hirashima et al., *Nippon Seramikkusu Kyokai Gakujutsu Ronbunshi*, 97, (3), (1989), pp. 235–238, no month avail.
"Vanadium Pentoxide Gels", Livage, *Chem. Mater.*, 3, (1991), pp. 578–593, no month avail.
"Sol–Gel Synthesis of Vanadium Oxide from Alkoxides", Nabavi et al., *Eur. J. Solid State Inorg. Chem.*, 28, (1991), pp. 1173–1192 no month avail.

(List continued on next page.)

*Primary Examiner*—David Brunsman
*Attorney, Agent, or Firm*—Gary L. Griswold; Walter N. Kirn; Gregory D. Allen

[57] ABSTRACT

A process for the preparation of a vanadium oxide colloidal dispersion is provided. The process includes a step of hydrolyzing vanadium oxoalkoxide with an excess of water to form a vanadium oxide colloidal dispersion containing at least a minimum effective amount of vanadium and no greater than about 3.5 wt-% vanadium, preferably containing about 0.3 wt-% to about 2 wt-% vanadium. The process can be carried out in the presence of an organic polymer or prepolymer to form a polymeric vanadium oxide colloidal dispersion.

35 Claims, No Drawings

OTHER PUBLICATIONS

Abstract for "Colloidal Vanadium Pentoxide", Ostermann, *Wiss. U. Ind.*, I, (1992), pp. 17–19, no month avail.

Abstract for "Vanadic Acid Esters and Some Other Organic Vanadium Compounds", Prandtl et al., *Z. Anorg. Chem.*, 82, pp. 103–129, no month avail.

"Synthesis and Characterization of Vanadium Oxide Gels from Alkoxy–Vanadate Precursors", Sanchez et al., *Mat. Res. Soc., Symp. Proc.*, 121, (1988), pp. 93–104, no month avail.

"The Preparation of Colloidal Vanadic Acid", Wegelin, *Z. Chem. Ind. Kolloide*, 2, (1912), pp. 25–28; and English abstract therefor, no month avail.

"The Preparation of Colloidal Vanadic Acid by a New Dispersion Method", Müller, *Z. Chem. Ind. Kolloide*, 8, (1911), pp. 302–303; and English abstract therefor, no month avail.

"Contribution to the Study of Rigid Macromolecule Dimensions, Comparison of Results of Electronic Microscope with Hydrodynamic Labs", Donnet, Physic Chemistry Laboratory, Superior School of Chemistry of Mulhouse, Paper received on Mar. 20, 1953, pp. 1–29 (and original paper in French).

J. Livage et al., "Sol–Gel Chemistry of Transition Metal Oxides", *Prog. Solid St. Chem.*, 18, 259–341, (1988).

VANADIUM OXIDE COLLOIDAL DISPERSONS AND ANTISTATIC COATINGS

This is a continuation of application No. 08/072,548, filed Jun. 4, 1993, now abandoned, which is a continuation-in-part of application No. 07/893,504, filed Jun. 4, 1992, now abandoned.

FIELD OF THE INVENTION

The present invention concerns an antistatic coating composition, a method of making a preferred antistatic coating composition, and a preferred coating made from such a composition. The composition includes an aqueous colloidal dispersion of vanadium oxide.

BACKGROUND OF THE INVENTION

There is a growing interest in antistatic materials and coatings in various fields of technology, particularly in the photographic and electronics industries. Antistatic materials (i.e., antistats) are electrically conductive materials. They utilize a conduction process that results in the dissipation of electrical charges (i.e., "static electricity"). Thus, it is desirable to use antistats in applications in which it is necessary to avoid the build-up of electrical charges, which can discharge suddenly and produce a detrimental effect. For example, in photographic applications, an antistatic coating on film avoids sudden discharges of built-up electrical charge that can cause undesirable recordation of the associated flash of light.

Preferred antistats are those that conduct electrons by a quantum mechanical mechanism rather than by an ionic mechanism. This is because antistats that conduct electrons by a quantum mechanical mechanism are effective independent of humidity. That is, they are suitable for use under conditions of low relative humidity, without losing effectiveness, and under conditions of high relative humidity, without becoming sticky. A major problem, however, with such electron-conducting antistats is that they generally cannot be provided as thin, transparent, relatively colorless coatings by solution coating methods. Although there have been many attempts to do so, such as by using defect semiconductor oxide particle dispersions and conductive polymers, there has been very little success in overcoming this problem. The use of vanadium oxide has proven to be the one exception, however. That is, effective antistatic coatings of vanadium oxide can be deposited in transparent, substantially colorless thin films by coating from aqueous dispersions.

Three unique properties that distinguish vanadium oxide from other antistatic materials are its conduction mechanism, dispersibility, and morphology. The latter two properties are generally highly dependent upon the method of synthesis, the first somewhat less so. The conduction mechanism in vanadium oxide is primarily a quantum mechanical mechanism known as small polaron hopping. By this mechanism, electrons are transported through the material by transmission (i.e., by "hopping") from one vanadium ion to the next. This conduction mechanism does not require the presence of a well-developed crystalline lattice or a specific defect structure, as do defect semiconductors such as doped tin oxide or doped indium oxide.

Because small polaron hopping electronic conduction does not require a well-developed crystalline structure, there is no need for an annealing step when a film or coating is made from vanadium oxide. Furthermore, vanadium oxide is conductive simply upon precipitation or formation in solution, without being adversely affected by changes in relative humidity. Thus, a highly dispersed form of vanadium oxide that exhibits electronic conductivity, and desirable morphology, particle size, and dispersion properties is useful for the preparation of conductive antistatic coatings.

The effectiveness of a dispersed form of vanadium oxide, i.e., a vanadium oxide colloidal dispersion, for the preparation of antistatic coatings can be expressed in terms of the surface concentration of vanadium. The surface concentration is described as the mass of vanadium per unit surface area, i.e., mg of vanadium per $m^2$ of substrate surface area, required to provide useful electrostatic charge decay rates. Generally, the lower the surface concentration of vanadium needed for effective conductivity in an antistatic coating, the more desirable the vanadium oxide colloidal dispersion. This is because, with a lower surface concentration of vanadium, there is typically less color imparted to the coating, the coating is more transparent and uniform, and in some circumstances the coating generally adheres better to the substrate and may even provide better adhesion for subsequent layers.

In the mid-1970s, Claude Guestaux of Eastman Kodak reported that a previously known synthetic method gives a vanadium oxide colloidal dispersion which, at the time, was considered uniquely useful for the preparation of antistatic coatings. Guestaux's method was based on a process originally described by E. Müller in 1911 in *Z. Chem. Ind. Kolloide*, 8, 1911, p. 302. The method is described in U.S. Pat. No. 4,203,769 (Guestaux) and consists of pouring molten vanadium pentoxide into water. The process has several drawbacks, however. These drawbacks include high energy requirements, the need for special reactor materials and equipment, and the creation of conditions which generate toxic vanadium oxide fumes. Furthermore, the Guestaux method results in incomplete dispersion of vanadium oxide. The nondispersed vanadium oxide must then be removed from the viscous dispersion; however, such viscous vanadium oxide dispersions are usually very difficult to filter.

There are several other methods known for the preparation of vanadium oxide colloidal dispersions. These include inorganic methods such as ion exchange acidification of $NaVO_3$, thermohydrolysis of $VOCl_3$, and reaction of $V_2O_5$ with $H_2O_2$. However, vanadium oxide colloidal dispersions prepared by these methods using inorganic precursors are much less effective for the preparation of antistatic coatings than colloidal dispersions prepared by the process described by Guestaux in U.S. Pat. No. 4,203,769. To provide coatings with effective antistatic properties from dispersions prepared from inorganic precursors typically requires substantial surface concentrations of vanadium. These surface concentrations of vanadium generally result in the loss of desirable properties such as transparency, adhesion, and uniformity.

SUMMARY OF THE INVENTION

The present invention is based on a discovery that, if properly controlled, the hydrolysis of vanadium oxoalkoxides gives products that are not gels, particles, or products similar to those obtained from inorganic precursors. Instead, hydrolysis of vanadium oxoalkoxides under appropriate conditions gives vanadium oxide colloidal dispersions that are exceptionally useful precursors for antistatic coatings. Highly effective vanadium oxide colloidal dispersions prepared by the methods of the present invention are characterized by: high aspect ratio colloidal particles, as observed in the final coating state by field emission scanning electron microscopy; and well-dispersed particles, i.e., not unacceptably agglomerated or flocculated particles. They may also be characterized by an effective concentration of vanadium(IV) ions, which are believed to be a source of mobile electrons in the quantum mechanical small polaron hopping mechanism.

The alkoxide-derived vanadium oxide colloidal dispersions of the present invention are similar to those prepared by the process of U.S. Pat. No. 4,203,769 (Guestaux), except that $V^{4+}$ concentrations are much higher (in fact $V^{4+}$ concentrations can, predictably and reproducibly, be made to vary over a surprisingly wide range, i.e., over a range of about 1–40% of total vanadium content) in the colloidal dispersions of the present invention. The alkoxide process for the preparation of vanadium oxide colloidal dispersions of the present invention offers advantages over the process of U.S. Pat. No. 4,203,769 (Guestaux). This includes variable $V^{4+}$ concentrations, energy savings, convenience, elimination of conditions whereby highly toxic vanadium-containing fumes may be generated, no need to filter the resultant colloidal dispersions, and ability to prepare the colloidal dispersion in situ (e.g., in organic polymer solutions).

Vanadium oxide sols, i.e., colloidal dispersions, of the present invention are prepared by hydrolyzing vanadium oxoalkoxides with an excess of water (preferably deionized water). Herein, "vanadium oxoalkoxides" refer to vanadium complexes with an oxide (=O) ligand and at least one alkoxide (—OR) ligand per vanadium atom. It is to be understood, however, that complexes referred to herein as vanadium oxoalkoxides may also include ligands other than the oxide and alkoxide groups. Examples of other ligands that may be present in the vanadium oxoalkoxides used in the present invention include carboxylates, sulfides, selenides, β-diketonates, halides, and pseudohalides such as —SCN⁻ and —CN⁻. Preferably, however, the vanadium oxoalkoxides are trialkoxides with one oxide and three alkoxide ligands. The vanadium oxoalkoxides useful in the methods of the present invention may be monomeric, dimeric, or polymeric.

In preferred embodiments, the vanadium oxoalkoxides are prepared in situ, i.e., without isolation and/or purification of the vanadium oxoalkoxide prior to use, by combining a vanadium oxide precursor species and an alcohol. The vanadium oxide precursor species is preferably a vanadium oxyhalide or vanadium oxyacetate. If the "vanadium oxoalkoxide" is prepared from a vanadium oxide precursor species, it may include ligands other than the oxide and alkoxide groups. For example, if a vanadium dioxide acetate is the vanadium oxide precursor species, the "vanadium oxoalkoxide" will typically contain oxide, alkoxide, and acetate ligands.

Preferably, the vanadium oxoalkoxide is a trialkoxide of the formula $VO(OR)_3$, wherein each R is substituted or unsubstituted and is independently selected from a group consisting of aliphatic, aryl, heterocyclic, and arylalkyl radicals. Herein, "substituted" R groups, i.e, substituted organic groups, mean that one or more hydrogen atoms are replaced by a functional group that is nonreactive to hydrolysis, and noninterfering with the formation of colloidal dispersions. Preferably, such functional groups include halide, hydroxide, thiol, and carbonyl groups, or mixtures thereof.

Each R is preferably independently selected from the group consisting of $C_{1-10}$ alkyl, $C_{1-10}$ alkenyl, $C_{1-10}$ alkynyl, $C_{1-18}$ aryl, and $C_{1-18}$ arylalkyl radicals. These radicals can be substituted or unsubstituted, i.e., contain only hydrogen atoms. If substituted, they are preferably substituted with a functional group such as a halide, hydroxide, thiol, carbonyl, or mixtures thereof. More preferably, each R is independently selected from a group consisting of unsubstituted $C_{1-6}$ alkyl radicals. When it is said that each R is "independently" selected from a group, it is meant that not all R groups in the formula $VO(OR)_3$ are required to be the same.

In the context of the present invention, the term "aliphatic" means a saturated or unsaturated linear, branched, or cyclic hydrocarbon radical. This term is used to encompass alkyls, alkenyls such as vinyl radicals, and alkynyls, for example. The term "alkyl" means a saturated linear or branched hydrocarbon radical. The term "alkenyl" means a linear or branched hydrocarbon radical containing at least one carbon-carbon double bond. The term "alkynyl" means a linear or branched hydrocarbon radical containing at least one carbon-carbon triple bond. The term "heterocyclic" means a mono- or polynuclear cyclic radical containing carbons and one or more heteroatoms such as nitrogen, oxygen, or sulfur or a combination thereof in the ring or rings, such as furan, thymine, hydantoin, and thiophene. The term "aryl" means a mono- or polynuclear aromatic hydrocarbon radical. The term "arylalkyl" means a linear, branched, or cyclic alkyl hydrocarbon radical having a mono- or polynuclear aromatic hydrocarbon or heterocyclic substituent. The aliphatic, aryl, heterocyclic, and arylalkyl radicals can be unsubstituted, or they can be substituted with various substituents such as Br, Cl, F, I, and OH groups.

Herein, "vanadium oxide" colloidal dispersions refer to colloidal dispersions of mixed valence vanadium oxide, wherein the formal oxidation states of the vanadium ions are typically +4 and +5. In this field, such species are often referred to as $V_2O_5$.

Herein, the terms "sol," "colloidal dispersion," and "colloidal solution" are used interchangeably. They all refer to a uniform suspension of finely divided particles in a continuous liquid medium. The average particle size in a sol or colloidal dispersion is usually between about $5 \times 10^{-4}$ micrometer and about $5 \times 10^{-1}$ micrometer.

The vanadium oxide colloidal dispersions of the present invention contain at least a minimum effective amount of vanadium and no greater than about 3.5 wt-% vanadium. Preferably they contain vanadium in the range from about 0.3 to about 2 wt-%. Herein, these weight percentages are calculated from the amount of vanadium in the vanadium oxoalkoxide starting material, and are based on the total weight of the dispersion. In preferred embodiments, the ratio of $V^{4+}$ ions to the total concentration of vanadium ions, i e., $V^{4+} + V^{5+}$ ions, is at least about 0.01:1, preferably at least about 0.05:1, and more preferably at least about 0.3:1.

The hydrolysis process of the present invention results in condensation of the vanadium oxoalkoxides to vanadium oxide colloidal dispersions. The hydrolysis can be carried out within a temperature range in which the solvent (i.e., water or a mixture of water and a water-miscible organic solvent) is in liquid form, e.g., within a range of about 0°–100° C. The process is preferably and advantageously carried out within a temperature range of about 20°–30° C., i.e., at about room temperature.

In preferred embodiments, the vanadium oxoalkoxide can be at least partially hydrolyzed before it is combined with the excess water. This can be done, for example, by spray drying the oxoalkoxide in the presence of water. Although the subsequent hydrolysis can be accomplished by adding the excess water to the vanadium oxoalkoxide, the vanadium oxoalkoxide is preferably added to the excess water.

In preferred embodiments, the water is combined with a water-miscible organic solvent, such as a low molecular weight ketone or an alcohol. In other preferred embodiments, the water or mixture of water and water-miscible organic solvent contains an effective amount of a hydroperoxide, such as $H_2O_2$. Optionally, the reaction mixture can be modified, for example, by the addition of other reagents such as an organic polymer, organic prepolymer, or metal dopants, by subsequent aging or heat treatments, or by the removal of alcohol by-products. By such modifications the vanadium oxide colloidal dispersion properties can be varied.

The methods of the present invention provide a dispersed form of vanadium oxide that is very effective for the preparation of antistatic coatings. Such antistatic coatings impart properties to coated articles such as: reduced tendency to attract dust; reduced tendency to form static tracks; reduced formation of airborne dust during wood sanding operations; reduced tendency for sparking or damaging electronic components; and fewer film handling difficulties. In sum, the alkoxide hydrolysis methods of the present invention produce vanadium oxide colloidal dispersions capable of forming effective and advantageous antistatic coatings with significantly less material than do known alkoxide hydrolysis methods.

DETAILED DESCRIPTION OF THE PREFERRED EMBODIMENTS

As required, detailed descriptions of the present invention are provided herein. In general, the detailed descriptions are to be considered as exemplary only. Therefore, the invention is not to be interpreted as limited to the specific formulations, arrangements, or methods identified and described, except as defined by the claims.

One reaction known to yield vanadium oxide products is the hydrolysis of vanadium alkoxides. The products of this hydrolysis reaction typically include solutions of partially hydrolyzed vanadium alkoxide species, $V_2O_5$ gels, and $V_2O_5$ particulates. None of the products produced by this reaction, however, has been described as a vanadium oxide colloidal dispersion with properties similar to those of the dispersion prepared according to the process of U.S. Pat. No. 4,203,769 (Guestaux). The products produced by the known hydrolysis methods require relatively high surface concentrations of vanadium for effective conduction. That is, when using vanadium oxide colloidal dispersions produced from the hydrolysis of vanadium alkoxides according to known methods, the amount of vanadium oxide required in a coating, i.e., the surface concentration of vanadium, for effective antistatic properties is relatively high. Thus, using vanadium oxide colloidal dispersions produced by known alkoxide hydrolysis methods, there are problems with color formation, transparency, adhesion, and uniformity in the antistatic coatings.

A report by C. Sanchez et al. in *Mat. Res. Soc., Symp. Proc.*, 121, 93 (1988) discusses the hydrolysis of vanadium oxoalkoxides by an excess of water. Therein, it is stated that the chemical pathway leading to $V_2O_5$ solutions and gels from this hydrolysis method is similar to the pathway leading to $V_2O_5$ solutions from inorganic precursors such as $NaVO_3$ and $VOCl_3$. Sanchez et al. also state that the $V_2O_5 \cdot nH_2O$ gels so obtained have structural and physical properties close to that of vanadium pentoxide gels prepared by polymerization of decavanadic acid. Because sols and gels prepared from inorganic precursors, including decavanadic acid, generally do not form advantageous antistatic coatings, it has therefore been generally understood that vanadium oxide colloidal dispersions produced from the hydrolysis of vanadium oxoalkoxides do not form advantageous antistatic coatings.

The present invention provides a process for the preparation of vanadium oxide colloidal dispersions that are advantageous precursors for antistatic coatings. That is, antistatic coatings prepared from the vanadium oxide colloidal dispersions of the present invention possess effective antistatic characteristics using generally low concentrations of vanadium. Such coatings are therefore less colored, more transparent, and in some circumstances more adherent than coatings made from vanadium oxide colloidal dispersions prepared from known alkoxide hydrolysis methods. Vanadium oxide colloidal dispersions of the present invention are prepared by hydrolyzing vanadium oxoalkoxides with an excess of water. The vanadium oxoalkoxides can be any of a variety of compounds that can produce colloidal dispersions capable of forming, i.e., usable to produce, antistatic coatings with the properties desired as herein defined.

The vanadium oxoalkoxides used in the methods of the present invention are vanadium complexes with one oxide ligand (=O) and at least one alkoxide ligand (—OR) per vanadium atom. They may include ligands other than the oxide and alkoxide groups, such as carboxylates, sulfides, selenides, $\beta$-diketonates, halides, and pseudohalides such as —SCN− and —CN−. The vanadium oxoalkoxides useful in the methods of the present invention may be monomeric, dimeric, or polymeric.

Preferably, the vanadium oxoalkoxides are of the formula $VO(OR)_3$, i.e., vanadium oxotrialkoxides, wherein each substituent R is substituted or unsubstituted and is independently selected from the group consisting of aliphatic, aryl, heterocyclic, and arylalkyl radicals. Preferably each R is independently selected from the group consisting of $C_{1-10}$ alkyl, $C_{1-10}$ alkenyl, $C_{1-10}$ alkynyl, $C_{1-18}$ aryl, and $C_{1-18}$ arylalkyl radicals. Each of these preferred alkoxide R groups may be substituted or unsubstituted. They may be substituted with halides, hydroxides, thiols, carbonyls, or mixtures thereof. More preferably each R group is independently selected from the group consisting of unsubstituted $C_{1-6}$ alkyl radicals. Examples of usable vanadium oxotrialkoxides include $VO(OEt)_3$, $VO(O\text{-}i\text{-}Pr)_3$, $VO(O\text{-}n\text{-}Pr)_3$, $VO(O\text{-}i\text{-}Bu)_3$, $VO(O\text{-}n\text{-}Bu)_3$, $VO(O\text{-}t\text{-}Amyl)_3$, $VO(O\text{-}n\text{-}pentyl)_3$, and $VO(O\text{—}CH_2CMe_3)_{2.3}(O\text{-}i\text{-}Bu)_{0.7}$. It is understood that the hydrolysis process can involve hydrolyzing one or more vanadium oxoalkoxides, i.e., a mixture of oxoalkoxides.

The vanadium oxoalkoxides can also be prepared in situ prior to use from a vanadium oxide precursor species and an alcohol. That is, the vanadium oxoalkoxides can be prepared without isolation and/or purification from a vanadium oxide precursor species and an alcohol. For example, the vanadium oxoalkoxides can be generated by combining a vanadium oxide precursor species, such as a vanadium oxyhalide ($VOX_3$) (preferably $VOCl_3$) or vanadium oxyacetate ($VO_2OAc$), with an appropriate alcohol, such as i-BuOH, i-PrOH, n-PrOH, n-BuOH, and t-BuOH. It is understood that if vanadium oxoalkoxides are generated from a vanadium oxide precursor species and an alcohol, they may contain ligands other than oxide and alkoxide ligands. For example, the product of the reaction of vanadium oxyacetate with an alcohol is a mixed alkoxide/acetate. Thus, herein the term "vanadium oxoalkoxide" is used to refer to species that have one oxide (=O) ligand and at least one alkoxide (—OR) ligand per vanadium atom, particularly if prepared in situ, i.e., without isolation and/or purification of the vanadium oxoalkoxide. Preferably, however, the vanadium oxoalkoxides are trialkoxides with one oxide and three alkoxide ligands.

The in situ preparations of the vanadium oxoalkoxides are preferably carried out under a dry, nonoxidizing atmosphere such as nitrogen or argon. The vanadium oxide precursor species is typically added to an appropriate alcohol at room temperature. For an exothermic reaction, it is preferable to add the vanadium oxide precursor species at a controlled rate such that the reaction mixture does not greatly exceed room temperature. The temperature of the reaction mixture can be further controlled by placing the reaction flask in a constant temperature bath, such as an ice water bath. The reaction of the vanadium oxide precursor species and the alcohol can be done in the presence of an oxirane, such as propylene oxide, ethylene oxide, or epichlorohydrin. The oxirane is effective at removing byproducts of the reaction of the vanadium oxide species with alcohols. If desired, volatile starting materials and reaction products can be removed through distillation or evaporative techniques, such as rotary evaporation. The resultant vanadium oxoalkoxide product, whether in the form of a solution or a solid residue after the use of distillation or evaporative techniques, can be combined directly with water to produce the vanadium oxide colloidal dispersions of the present invention.

The methods of the present invention involve combining a vanadium oxoalkoxide and an excess of water, preferably with stirring until a homogeneous colloidal dispersion forms. By an "excess" of water, it is meant that a sufficient amount of water is present relative to the amount of vanadium oxoalkoxide such that there is greater than 1 equivalent of water per equivalent of vanadium oxoalkoxide. That is, there is greater than a 1:1 molar ratio of water to vanadium-bound alkoxide ligands. Preferably, a sufficient amount of water is used such that the final colloidal dispersion formed contains no greater than about 3.5 wt-% vanadium and at least a minimum effective amount of vanadium. This typically requires a molar ratio of water to vanadium alkoxide of at least about 45:1, and preferably at least about 150:1. Herein, by "minimum effective amount" of vanadium it is meant that the colloidal dispersion contains an amount of vanadium in the form of vanadium oxide, whether diluted or not, which is sufficient to form an effective antistatic coating for the use desired.

For most uses, an effective antistatic coating has a surface concentration of vanadium, i.e., coating weight, ($[V]_{eff}$, calculated in mg of vanadium per $m^2$ of substrate surface area) of less than about 12 $mg/m^2$; however, for some end uses a value of $[V]_{eff}$ of less than about 20 $mg/m^2$ can be tolerated. Preferably, however, it is desirable that the antistatic coating have a $[V]_{eff}$ of less than about 6 $mg/^2$, and more preferably less than about 3 $mg/m^2$, most preferably less than about 2 $mg/m^2$. Generally, lower surface concentrations of vanadium are desired because lower coating weights of vanadium oxide tend to be less colored, more transparent, more uniform, and in certain circumstances possess better adhesion properties than high coating weights of vanadium oxide.

The value of $[V]$eff is the calculated surface concentration of vanadium required to provide an electrostatic charge decay time of less than 0.1 seconds for decay of a 5000 V potential to less than 50 V. The surface concentration of vanadium in the antistatic coatings of the present invention can be calculated from: (1) formulation data, assuming 100% conversion of the vanadium oxoalkoxide to the vanadium oxide colloidal dispersion, and also assuming the density of each successively diluted vanadium oxide colloidal dispersion is that of water (1 g/mL); and (2) the wet coating thickness of the dilute dispersion applied using a No. 3 Mayer Bar is 6.9 micrometers.

Colloidal dispersions with a vanadium concentration greater than about 3.5 wt-% typically have poor dispersion properties, i.e., they are not dispersed well and tend to be gelatinous, and the coatings produced therefrom have poor antistatic properties. A coating with "poor" antistatic properties is one with a $[V]_{eff}$ value of greater than about 20 $mg/m^2$. Interestingly, colloidal dispersions originally prepared containing above about 3.5 wt-% vanadium do not typically exhibit improved properties if diluted to a colloidal dispersion containing a lesser amount of vanadium prior to formation of the coating. That is, the properties of a vanadium oxide colloidal dispersion containing above about 3.5 wt-% vanadium cannot be easily improved upon dilution of the colloidal dispersion. It is possible, however, to improve the quality and stability of the colloidal dispersions containing above about 3.5 wt-% vanadium by adding an amine, such as, for example, N,N-diethylethanolamine. Although not intending to be bound by theory, it is believed that this increases the degree of ionization of colloidal particles by deprotonating VOH groups.

In preparing preferred embodiments of the vanadium oxide colloidal dispersion of the present invention, a sufficient amount of water is used such that the colloidal dispersion formed contains about 0.3 wt-% to about 2 wt-% vanadium. Most preferably, a sufficient amount of water is used so that the colloidal dispersion formed upon addition of the vanadium-containing species contains about 0.6 wt-% to about 1.7 wt-% vanadium.

The use of deionized water appears to improve the dispersive characteristics of the colloidal dispersion and facilitate production of an antistatic coating with highly desirable properties.

By "deionized" water, it is meant that the water has had a significant amount of any $Ca^{2+}$, $Mg^{2+}$, and $Fe^{2+}$ ions originally present removed. Preferably, the deionized water contains less than about 50 parts per million (ppm) of these multivalent cations (total concentration of all multivalent cations), and more preferably less than about 5 ppm. Most preferably, the deionized water of the present invention contains less than about 50 ppm of a total cation concentration, including multivalent cations and monovalent cations, such as $Na^+$.

Multivalent cations cause the greatest detrimental effect to the quality of the dispersions of the present invention. That is, the dispersions are much more tolerant of monovalent cations, such as $Na^+$, than they are of multivalent cations, such as $Ca^{2+}$, $Mg^{2+}$, and $Fe^{2+}$. For example, the dispersions of the present invention can tolerate a total concentration of multivalent cations of up to about 50 ppm (parts per million), and a total concentration of monovalent cations of up to about 500 ppm, before flocculation occurs and the quality of the dispersion is significantly diminished.

A variety of methods can be used to remove multivalent cations ($Ca^{2+}$, $Mg^{2+}$, and $Fe^{2+}$) and monovalent cations ($Na^+$) from water. These include the use of commercial deionizing columns, ion exchange resins, or reverse osmosis systems. In a typical ion exchange process, water is passed through a column containing ion exchange resin having $H^+$ ions and then through a column containing ion exchange resin having $OH^-$ ions. The cations in the water are replaced by the $H^+$ ions from the resin, and the anions in the water are replaced by the $OH^-$ ions in the resin to create "deionized" water. Depending on the charge balance of the water, it can be neutral, slightly acidic, or slightly basic. The "deionized" water of the present invention can also be prepared using "softening" agents, such as $Na_2CO_3$, which replace the multivalent cations with $Na^+$. Thus, the term deionized water, as used herein, includes within its scope "soft" water, which contains $Na^+$ ions; however, for soft water to be usable in the preparation of good quality dispersions, it is preferred that the water contain less than about 500 ppm $Na^+$ ions.

Water useful in the methods of the present invention generally has a pH sufficient to render colloidal dispersions with a pH in the range from about 1.5 to about 8. If the pH of the colloidal dispersion is less than about 1.5, the dispersion properties are usually detrimentally affected such that they produce inadequate antistatic coatings. If the pH of the colloidal dispersion is more than about 8, the dispersion properties tend to be detrimentally affected because the dispersion tends to flocculate. Typically, water with a pH within a range of about 5 to about 9 will produce a colloidal dispersion with a pH within a range of about 1.5 to about 8.

In the processes of the present invention, a vanadium oxoalkoxide is preferably hydrolyzed by adding the vanadium oxoalkoxide to the water, as opposed to adding the water to the vanadium oxoalkoxide. This is advantageous because it typically results in the formation of a desirable colloidal dispersion and generally avoids excessive gelling. Whether the vanadium oxoalkoxide is added to the water or the water is added to the vanadium oxoalkoxide, the vanadium oxoalkoxide can be at least partially hydrolyzed before it is combined with the excess water. This can be done, for example, by spray drying the oxoalkoxide in the presence of water. The spray dried vanadium oxoalkoxide can then be combined with the excess water.

In the process of the present invention, the water initially reacts with the vanadium oxoalkoxides in a hydrolysis reaction. The hydrolyzed product then subsequently undergoes a condensation reaction to form a mixed valence vanadium oxide colloidal dispersion. That is, the vanadium oxide colloidal dispersions formed contain vanadium atoms in both the +4 and +5 formal oxidation states. Often the product is referred to as vanadium pentoxide ($V_2O_5$); however, its molecular formula can be more accurately represented by $V_2O_{4.67}$.

So long as there is an excess of water used in the hydrolysis and subsequent condensation reactions of the vanadium oxoalkoxides, water-miscible organic solvents can also be present. That is, in certain preferred embodiments the vanadium oxoalkoxides can be added to a mixture of water and a water-miscible organic solvent. Miscible organic solvents include alcohols, low molecular weight ketones, dioxane, and solvents with a high dielectric constant, such as acetonitrile, dimethylformamide, and dimethylsulfoxide. Preferably, the organic solvent is acetone or an alcohol, such as i-BuOH, i-PrOH, n-PrOH, n-BuOH, and t-BuOH.

Preferably, the reaction mixture contains an effective amount of hydroperoxide, such as $H_2O_2$ or t-butyl hydroperoxide. An "effective amount" of a hydroperoxide is an amount that positively or favorably affects the formation of a colloidal dispersion capable of producing an antistatic coating with a value of $[V]_{eff}$ of less than about 2 mg/m². The presence of the hydroperoxide appears to improve the dispersive characteristics of the colloidal dispersion and facilitate production of an antistatic coating with highly desirable properties. That is, when an effective amount of hydroperoxide is used the resultant colloidal dispersions tend to be less turbid and better dispersed. Preferably, the hydroperoxide is present in an amount such that the molar ratio of vanadium oxoalkoxide to hydroperoxide is within a range of about 1:1 to 4:1. While not wishing to be held to any particular theory, it is believed that the hydroperoxide accelerates the formation of acicular, i.e., needle-like, vanadium oxide colloidal particles.

Advantageously, the process of the present invention can be carried out in the presence of an organic polymer or prepolymer. In this way, colloidal dispersions of vanadium oxide can be prepared in situ in solutions or dispersions of organic polymers or prepolymers with which colloidally dispersed vanadium oxide is otherwise incompatible, as evidenced by flocculation of the colloidal dispersion. The organic polymers or prepolymers that are usable in this in situ manner are those that are soluble or dispersible in water or water and a water-miscible solvent. Such organic polymers or prepolymers include polyacrylic acid; polyols such as those available from Dow Chemical under the trademark VORANOL TM; polyvinyl alcohols; hydroxyethyl cellulose; polymethyl methacrylate; polyethyl acrylate; polystyrene; polystyrene/butadiene copolymers; polyvinylidene chloride. Preferably, the useful organic polymers or prepolymers are "soluble" in water or a mixture of water and a water-miscible organic solvent as described above. The weight ratio of vanadium oxoalkoxide initially added to an organic polymer or prepolymer is preferably within a range of about 1:1 to about 1:499.

Generally, the process of the present invention, i.e., the hydrolysis and condensation reactions of the vanadium oxoalkoxides using an excess of water, can be carried out in air. Although it is typically preferred that the alkoxide be added to the water, the rate of addition is not typically crucial. It is desirable, however, that the mixture be stirred during the hydrolysis and condensation reactions. Furthermore, the initial hydrolysis can be carried out at any temperature in which the solvent (i.e., water or a mixture of water and a water-miscible organic solvent) is in a liquid form, e.g., within a range of about 0°–100° C. It is preferred, however, that the initial hydrolysis, and subsequent condensation, reactions be carried out within a temperature range of about 20°–30° C., i.e., at about room temperature.

The homogeneous solution resulting from hydrolysis is preferably subjected to an aging process to allow for initially formed vanadium oxide fibrils to coalesce. The aging process typically involves storing the solution in a constant temperature bath until a thixotropic colloidal dispersion is formed. Preferably, the aging is conducted for about 1-6 days in a 20°–90° C. water bath, more preferably a 40°–60° C. water bath. Improvement can be observed, however, with aging conditions of up to about 10 days. Most preferably, aging is conducted for a short period of time, such as for about 8-24 hours. Typically, an aged colloidal dispersion provides a more advantageous coating than one that has not been aged. For example, a coating made from an unaged colloidal dispersion can require a surface vanadium concentration 8 times greater than a material aged at 90° C. for 8 hours (to provide an electrostatic charge decay time of less than 0.1 second for decay of a 5000 V potential to less than 50 V). Thus, the aging process results in a colloidal dispersion capable of being coated at a low coating weight.

The concentration of $V^{4+}$ in the resultant colloidal dispersions can be determined by titration with permanganate. Preferably, the mole fraction of $V^{4+}$ to ($V^{4+} + V^{5+}$), i.e., $V^{4+}$/total vanadium, is at least about 0.01:1, preferably at least about 0.05:1, and more preferably at least about 0.30:1. The concentration of $V^{4+}$ in the resultant colloidal dispersions can be easily varied simply by removing volatile reaction products through distillation subsequent to hydrolysis of the vanadium oxoalkoxide. Significantly, the $V^{4+}$ concentrations can be varied over a range of about 1-40% of the total vanadium content. Although not intending to be limited by any theory, it is believed that the concentration of $V^{4+}$ may contribute to the intrinsic conductivity of the coatings. Furthermore, it is believed that the $V^{4+}$ ions contribute to the formation of the colloidal dispersions, perhaps acting as polymerization initiators or by controlling intercalation.

The vanadium oxide colloidal dispersions of the present invention can be diluted as desired with water or a water-miscible organic solvent prior to coating onto a substrate. The water-miscible organic solvent can be any of those listed above that can be present in the reaction mixture during the preparation of the colloidal dispersions. Preferably, the organic solvent with which the colloidal dispersion is diluted, prior to forming a film, is acetone or an alcohol.

Typically, the colloidal dispersions of the present invention can be stored at any concentration. Preferably, they are stored at a concentration of about 0.3 wt-% to 2 wt-% vanadium. If necessary, the originally formed dispersions can be diluted to this concentration with water or a water-miscible organic solvent. No particular precautions need be observed during storage other than maintaining the temperature above the freezing point of the colloidal dispersions. If allowed to freeze, the colloidal dispersion is generally destroyed. The colloidal dispersions can be stored in any type of container, preferably glass or plastic. Furthermore, they can be stored in the presence or absence of light.

The vanadium oxide colloidal dispersions of the present invention can be coated onto any substrate. Advantageously, however, they are coated on nonconductive substrates, or substrates that have less than a desirable conductivity for the proposed use. That is, the vanadium oxide colloidal dispersions of the present invention are preferably used on any substrate or product for which the removal of electrostatic charges is desirable. For example, the colloidal dispersions can be coated onto materials such as paper, glass, cloth, ceramic materials, cermet materials, and a variety of polymeric materials, including cellulose esters, polyesters, polycarbonates, polyolefins, copolymers, and terpolymers. The colloidal dispersions can be coated onto products such as floor tiles, magnetic tapes, photographic film, cinematographic film, adhesive tapes, fibers, optical discs, ophthalmic lenses, overhead projector films, furniture, fabrics, and video display screens. More preferably, the vanadium oxide colloidal dispersions of the present invention can be used on any substrate or product for which a transparent coating is needed. This includes photographic film, cinematographic film, overhead projector films, video display screens, and optical discs. The colloidal dispersions of the present invention can be coated directly onto any of these substrates or over an intermediate layer of a material that promotes adhesion between the antistatic coating and the substrate.

The vanadium oxide colloidal dispersions of the present invention can be applied to a substrate by a variety of conventional solution coating methods. These include roll coating, brush coating, hopper coating, spray coating, curtain coating, slide coating, knife coating, and rotogravure coating. Advantageously, the colloidal dispersions of the present invention are coated using a slide coating, roll coating, or rotogravure coating process. These methods, and the techniques by which they are implemented, are all well known in the coating industry.

The amount of vanadium oxide colloidal dispersion used in the coating process can be widely varied. The upper limit of the amount used is generally controlled by the quality of the particular dispersion and the desire for a transparent and relatively colorless coating, i.e., one that is difficult to detect by the human eye. That is, although coatings can be prepared with coverages of 100 mg/m$^2$ and higher, for many uses it is preferable to have as low a coating weight coating as possible, e.g., no more than about 3 mg/m$^2$, to decrease the color imparted to the coating, increase its transparency, improve uniformity, and, in certain circumstances, improve adhesion. Such low coating weight coatings typically require a high quality colloidal dispersion, such as can be produced using the methods of the present invention, because the lower the quality of the colloidal dispersion, the more material needed to produce an acceptable antistatic coating. Because the vanadium oxide colloidal dispersions are colored, the more material used, the more the coating is colored; however, if the vanadium oxide coating weight is sufficiently low, the coating does not appear colored. Typically, an apparently "colorless" coating can be obtained with a coverage of no more than about 3 mg/m$^2$, preferably with no more than about 1.5 mg/m$^2$, and more preferably with no more than about 1 mg/m$^2$. By "colorless" it is meant that the coatings do not show significant absorption in the visible region of the spectrum and are substantially undetectable using a Macbeth Densitometer Model RD 514 (Newburg, N.Y.).

The coatings prepared from the vanadium oxide colloidal dispersions of the present invention typically contain whisker-shaped or needle-shaped particles.

These particles have a high aspect ratio, i.e., the ratio of the length to the width of the particles, and are generally evenly distributed. By "high aspect ratio" it is meant that the ratio of the length to the width of the particles, as observed in the coatings produced from the colloidal dispersions of the present invention by Field Emission Electron Microscopy, is generally in the range from about 10 to 90. Particles having relatively short lengths (as compared to particles having long lengths) tend to have relatively small diameters (as compared to larger diameter particles), but small diameter particles do not necessarily have short lengths.

The vanadium oxide colloidal dispersions and antistatic coatings of the present invention can contain a variety of additives as desired. They can contain polymeric binders that improve the mechanical properties of the antistatic coatings; wetting agents that promote coatability; metal dopants or modifiers such as $VO_2$, $Ag_2O$, $Cu_2O$, $MnO$, $ZnO$, $Nb_2O_5$, $MoO_3$, $WO_3$, $Sb_2O_3$, $GeO_2$, $Nd_2O_3$, $Sm_2O_3$, $Gd_2O_3$, $Yb_2O_3$, and $Eu_2O_3$ that alter the dispersion properties, color, and/or electrical conductivity; dyes such as methylene blue, crystal violet, and acid violet; biocides; preservatives; antifreeze agents; surfactants; and anti-foam agents. Metal dopants can be added as metal alkoxides, salts, or compounds during the hydrolysis of the vanadium oxide dispersions, or after the vanadium oxide dispersions are formed.

Objects and advantages of this invention are further illustrated by the following examples, but the particular materials and amounts thereof recited in these examples, as well as other conditions and details, should not be construed to unduly limit this invention. All parts and percentages are by weight unless otherwise indicated.

EXPERIMENTAL EXAMPLES

Vanadium oxide colloidal dispersions were prepared as described below. Coating dispersions, i.e., vanadium oxide colloidal dispersions suitable for coating, were prepared with successively greater dilution (each successive coating dispersion was one half the concentration of the previous coating dispersion). Coatings were prepared by hand spreading using a No. 3 Mayer bar onto poly(vinylidene chloride) (PVDC) primed polyester (available from Specialty Film Division of the 3M Company, St. Paul, Minn.). Each subsequent vanadium oxide coating had one half the surface vanadium concentration, i.e., coating weight, as the previous one. The effectiveness of the vanadium oxide colloidal dispersions for the preparation of antistatic coatings was determined as the surface concentration of vanadium ($[V]_{eff}$, in mg of vanadium per m² of substrate surface area) required to provide an electrostatic charge decay time of less than 0.1 second for decay of a 5000 V potential to less than 50 V. The surface concentration of vanadium reported in the following examples was calculated from formulation data assuming the density of each successively diluted vanadium oxide colloidal dispersion to be that of water (1 g/mL), and the wet coating thickness obtained with the No. 3 Mayer Bar to be 6.9 micrometers. An Inductively Coupled Plasma (ICP) Spectroscopic analysis of vanadium surface concentration of several coated polyester film samples showed that the actual vanadium surface concentration was consistently about 40% of that calculated from the amount coated from a particular concentration of coating dispersion. Times required for decay of a 5000 V charge (to less than 50 V) were determined using a model 406C Static Decay Meter from Electro-Tech Systems, Inc., Glenside, Pa. Concentrations of $V^{4+}$ were determined by titration with standardized $KMnO_4$ solution, with the endpoint determined visually by the persistence of unreacted permanganate.

The deionized water used in the examples below was prepared by pumping well water through a cation exchange bed (regenerated with sulfuric acid) and then through an anion exchange bed (regenerated with NaOH). The cation exchange resins used were sulfonated polystyrenes crosslinked with divinyl benzene, and the anion exchange resins used were quaternary ammonium styrenes crosslinked with divinyl benzene. These resins are commonly available under the trade designation AMBERLITE ™ manufactured by Rohm & Haas, Philadelphia, Pa. In the process, cations were exchanged for $H^+$ ions and anions were exchanged for $OH^-$ ions. After passing through the exchange resins, the water was held in a tank prior to use.

EXAMPLE 1

A vanadium oxide colloidal dispersion was prepared by adding $VO(O-i-Bu)_3$ (15.8 g, 0.055 mol, product of Akzo Chemicals, Inc, Chicago, Ill.) to a rapidly stirring solution of $H_2O_2$ (1.56 g of 30% aqueous solution, 0.0138 mol, product of Mallinckrodt, Paris, Ky.) in deionized water (232.8 g), giving a solution with a vanadium concentration of 0.22 mole/kg (1.1% vanadium). Upon addition of $VO(O-i-Bu)_3$, the mixture became dark brown and gelled within five minutes. With continued stirring, the dark brown gel was broken up giving an inhomogeneous, viscous dark brown colloidal dispersion. This colloidal dispersion was stirred for about 45 minutes to provide a homogeneous dispersion. The dispersion was further stirred for about 1.5 hours, and then transferred to a polyethylene bottle and aged in a constant temperature bath at 50° C. for 6 days to give a dark brown thixotropic gelatinous colloidal dispersion (i.e., a colloidal dispersion in which the dispersed phase has combined to produce a semi-solid material with a three-dimensional solid network containing a large volume of interconnecting pores filled with a liquid).

The surface concentration of vanadium required to provide static decay of 5000 V to less than 50 V in less than 0.1 second, $[V]_{eff}$, was determined for the vanadium oxide colloidal dispersion as follows. Portions of the vanadium oxide colloidal dispersion, containing 1.1% vanadium, were diluted with deionized $H_2O$ to provide colloidal dispersions with 0.17, 0.084, 0.042, 0.021, 0.011, and 0.005% vanadium. Each diluted dispersion was coated by hand spreading using a No. 3 Mayer bar onto PVDC primed polyester to produce vanadium oxide coatings with calculated surface vanadium concentrations of 11.5, 5.76, 2.88, 1.44, 0.72, and 0.36 mg/m², respectively. The static decay times for decay of a 5000 V potential to less than 50 V were measured for each of these coatings, and the value of $[V]_{eff}$ was determined to be 1.4 mg/m².

The concentration of $V^{4+}$ in the thixotropic gelatinous colloidal dispersion containing 1.1% vanadium was determined by titration with permanganate as follows. The dark brown thixotropic gelatinous colloidal dispersion was diluted with deionized $H_2O$ to give a dark brown colloidal dispersion containing 0.28% vanadium. A sample of this colloidal dispersion (90.0 g) was acidified with 18.6 g of 0.90M aqueous $H_2SO_4$ to give a light greenish yellow solution. This acidified colloidal dispersion was titrated with 21.5 mL of freshly standardized 0.019M KMnO$_4$ solution (MnO$_4^-$ +5V$^{4+}$ +8H$^+$ →5V$^{5+}$ +4H$_2$O+Mn$_{2+}$). The endpoint was determined by the persistence of pink MnO$_4^-$ for greater than 10 seconds. A correction was made for reducible aldehydes in the supernatant liquid of the colloidal dispersion by precipitating out colloidal vanadium oxide and titrating the supernatant exactly as described above. To precipitate out the colloidal vanadium oxide, 3.33 g of Al$_2$(SO$_4$)$_3$·16H$_2$O was added to 200 g of the 0.28% vanadium-containing vanadium oxide colloidal dispersion, and the precipitated vanadium oxide was removed by centrifugation. For a 90.0 g sample of the supernatant liquid, 5.06 mL of 0.0198M KMnO$_4$ solution was required. The concentration of V$^{4+}$ in the vanadium oxide colloidal dispersion containing 0.28% vanadium was $1.8 \times 10^{-2}$ mole/kg. The mole fraction of V$^{4+}$ (V$^{4+}$/total vanadium) was 0.33.

A coating with a calculated surface vanadium concentration of 2.88 mg/m$^2$ (prepared by coating the 0.042% vanadium oxide colloidal dispersion onto PVDC primed polyester film by hand spreading with a No. 3 Mayer bar) was evaluated by field emission scanning electron microscopy. The micrograph showed that the coating consisted of evenly dispersed, whisker-shaped colloidal particles of vanadium oxide, approximately 0.02–0.08 micrometer wide and 1.0–3.5 micrometers long. The aspect ratio was approximately 40 to 70 as measured by Field Emission Electron Microscopy (FESEM). Particles having relatively short lengths (as compared to particles having long lengths) tended to have relatively small diameters (as compared to large diameter particles), but small diameter particles did not necessarily have small diameters.

The following illustrates the calculation of coating weight:
The initial solution has a vanadium concentration of 0.22 mole/kg, which is equivalent to 1.1% vanadium. This 1.1% solution is diluted with water to form, for example, a 0.17% solution:

100 mL × 1.1 = X mL × 0.17
X = 647 mL

That is, 547 mL of water are added to 100 mL of a 1.1% dispersion to produce a 0.17% dispersion. 0.17% is equivalent to 0.0017 grams in 1 mL.

Assuming the dispersion density is that of water (i.e., 1 g/mL), the coating thickness is 6.9 micrometers, and 1 mL=1 cm$^3$, the number of milliliters of dispersion required to coat a 1 meter × 1 meter square at 6.9 micrometers thick is:

$6.9 \times 10^{-6}$ meters × (1 meter)$^2$ × $10^6$ centimeters$^3$/m$^3$ = 6.9 mL
$6.9 \times 0.0017 = 0.011$ grams of vanadium spread over a square meter

EXAMPLES 2-7

The procedure of Example 1 was repeated, including the aging step, except the VO(O-i-Bu)$_3$ was replaced with equimolar amounts of VO(OEt)$_3$ (Example 2), VO(O-i-Pr)$_3$ (Example 3), VO(O-n-Pr)$_3$ (Example 4), VO(O-n-Bu)$_3$ (Example 5), VO(O—CH$_2$CMe$_3$)$_{2.3}$(O-i-Bu)$_{0.7}$ (Example 6), and VO(O-t-Amyl)$_3$ (Example 7). VO(O-i-Pr)$_3$ was obtained from Alfa Products, Ward Hill, Mass., and used as received. VO(OEt)$_3$, VO(O-n-Pr)$_3$, VO(O-n-Bu)$_3$, and VO(O-t-Amyl)$_3$ were prepared by the reaction of ammonium metavanadate (product of Aldrich Chemical Co., Milwaukee, Wis.) with the corresponding alcohol as described by F. Cartan et al. in *J. Phys. Chem.*, 1960, 64, 1756, the disclosure of which is incorporated herein by reference. They were then purified by vacuum distillation. VO(O-CH$_2$CMe$_3$)$_{2.3}$(O-i-Bu)$_{0.7}$ was prepared by alcohol exchange from VO(O-i-Bu)$_3$ and purified by vacuum distillation. In each of Examples 2–7, the amount of deionized H$_2$O was adjusted to give a colloidal dispersion with 1.1% vanadium. For each reaction, the molar ratio of the vanadium alkoxide to H$_2$O$_2$ was 4:1, as in Example 1.

Values of [V]$_{eff}$ for the vanadium oxide colloidal dispersions prepared in Examples 2–7 were determined as described in Example 1: Example 2, [V]$_{eff}$=1.4 mg/m$^2$; Example 3, [V]$_{eff}$=1.4 mg/m$^2$; Example 4, [V]$_{eff}$=1.4 mg/m$^2$; Example 5, [V]$_{eff}$=2.9 mg/m$^2$; Example 6, [V]$_{eff}$=2.9 mg/m$^2$; Example 7, [V]$_{eff}$=2.9 mg/m$^2$.

EXAMPLE 8

A vanadium oxide colloidal dispersion was prepared by adding VO(O-i-Bu)$_3$ (product of Akzo Chemicals, Inc., Chicago, Ill.) to rapidly stirring deionized water to give a sol with a vanadium concentration of 0.22 mole/kg (1.1% vanadium). After stirring about 10 minutes, the sol became deep red and homogeneous. The sample was stirred for 1.5 hours at room temperature. It was then transferred to a polyethylene bottle and aged in a constant temperature bath at 50° C. for 6 days to give a dark brown thixotropic gelatinous colloidal dispersion.

The value of [V]$_{eff}$ for the vanadium oxide colloidal dispersion was determined by diluting with deionized water, coating onto PVDC primed polyester, and measuring static decay times as described in Example 1. It was found to be 1.4 mg/m$^2$. The concentration of V$^{4+}$ in the gelatinous colloidal dispersion was determined by titration with permanganate. A colloidal dispersion (containing 90.0 g, 0.28% vanadium) was acidified and titrated as described in Example 1, but 24.8 mL of the 0.0198M KMnO$_4$ solution was used for the titration. Supernatant from the colloidal dispersion (90.0 g) was titrated with 5.05 mL of the 0.0198M KMnO$_4$ solution as described in Example 1. The concentration of V$^{4+}$ in the 0.28% vanadium-containing vanadium oxide colloidal dispersion was $2.2 \times 10^{-2}$ mole/kg. The mole fraction V$^{4+}$ (V$^{4+}$/total vanadium) was 0.39.

EXAMPLES 3-12

The procedure of Example 8 was repeated except the VO(O-i-Bu)$_3$ was replaced with equimolar amounts of VO(O-i-Pr)$_3$ (Example 9), VO(O-n-Pr)$_3$ (Example 10), VO(O-n-Bu)$_3$ (Example 11), and VO(OCH$_2$CMe$_3$)$_{2.3}$(O-i-Bu)$_{0.7}$ (Example 12). Values of [V]$_{eff}$ for the vanadium oxide colloidal dispersions prepared in Examples 9–12 were determined as described in Example 1: Example 9, [V]$_{eff}$=1.4 mg/m$^2$; Example 10, [V]$_{eff}$=2.9 mg/m$^2$; Example 11, [V]$_{eff}$=5.8 mg/m$^2$; Example 12, [V]$_{eff}$=2.9 mg/m$^2$.

EXAMPLE 13

This Example describes the preparation of a vanadium oxide colloidal dispersion from VOCl$_3$, via in situ generated vanadium alkoxide species. VOCl$_3$ (25.1 g, 0.145 mol, product of Aldrich, Milwaukee, Wis.) was added dropwise to a solution of propylene oxide (42.03 g, 0.724 mol, product Aldrich, Milwaukee, Wis.) and i-BuOH (71.6 g, 0.966 mol, product of Aldrich, Milwaukee, Wis.) contained in a stoppered, nitrogen purged 500 mL round-bottomed flask. The reaction mixture was rapidly stirred and cooled in an ice water bath. The rate of addition of VOCl$_3$ was controlled so that the reaction temperature did not exceed 25° C. Volatile compounds were removed from the reaction mixture by rotary evaporation at 60°–70° C. to give 48.9 g of a light yellow liquid. GC/MS analysis of the volatile reaction products indicated the presence of approximately 65% i-BuOH, 30% 1-chloro-2-propanol, 4% 2-chloro-1-propanol, and minor amounts of 1-(2-methyl propoxy)-2-propanol and 2-(-2-methyl propoxy)-1-propanol. The distillation residue, i.e., the light yellow liquid, (10.0 g, containing 0.030 mol vanadium) was added to 125.4 g rapidly stirring deionized $H_2O$ to give a product which was deep red and homogeneous after stirring approximately 15 minutes. After stirring overnight at room temperature, the sample was aged at 50° C. for 2 days to give a vanadium oxide colloidal dispersion containing 1.1% vanadium. The value for $[V]_{eff}$ for the colloidal dispersion was 11.5 mg/m$^2$ as determined by the procedure described in Example 1.

EXAMPLE 14

The procedure of Example 13 was repeated except the distillation residue (10.0 g) was added to a solution of $H_2O_2$ (0.85 g of 30% solution, 0.0076 mol) in 124.5 g deionized $H_2O$. Upon addition of the distillation residue, the mixture became dark brown and gelled within five minutes. With continued stirring, the dark brown gel broke up giving an inhomogeneous, viscous dark brown sol which was homogeneous in about 45 minutes. The sample was allowed to stir overnight at room temperature and was then aged at 50° C. for 2 days. The value of $[V]_{eff}$ for the colloidal dispersion was 5.8 mg/m$^2$ as determined by the procedure described in Example 1.

EXAMPLE 15

This Example demonstrates the preparation of a vanadium oxide colloidal dispersion from $VO_2OAc$, presumably via in situ generated vanadium alkoxide species. $VO_2OAc$ (1.00 g, 7.0 mol, prepared as described by F. Preuss et al. in *Inorg. Nucl. Chem.*, 35, 3723 (1973), the disclosure of which is incorporated herein by reference) was dissolved in 1.57 g i-BuOH to give a clear, dark greenish black solution. This solution was added to deionized water (29.45 g), while rapidly stirring. The solution was then stirred for about 5 hours, resulting in a clear, greenish brown colloidal dispersion of vanadium oxide. The vanadium oxide colloidal dispersion was aged for 6 days at room temperature. The value of $[V]_{eff}$ for the colloidal dispersion was 11.5 mg/m$^2$ as determined by the procedure described in Example 1.

EXAMPLES 16–19

These Examples show the effect of varying vanadium concentrations in the alkoxide hydrolysis reaction on the effectiveness of vanadium oxide colloidal dispersions for the preparation of antistatic coatings. Vanadium oxide colloidal dispersions were prepared by adding VO(O-i-Bu)$_3$ to rapidly stirring deionized water in the amounts shown in Table 1. After aging overnight at room temperature, the colloidal dispersions were allowed to age three more days at room temperature or 50° C. $[V]_{eff}$ of the colloidal dispersions, determined as described in Example 1, are listed in Table 1.

TABLE 1

| Example | Mass VO(O-i-Bu)$_3$, g | Mass water, g | Percent vanadium | $[V]_{eff}^a$ mg/m$^2$ | $[V]_{eff}^b$ mg/m$^2$ |
|---|---|---|---|---|---|
| 16 | 1.58 | 98.4 | 0.28 | 11.5 | 11.5 |
| 17 | 3.16 | 96.8 | 0.56 | 11.5 | 11.5 |
| 18 | 6.30 | 93.7 | 1.12 | 11.5 | 5.8 |
| 19 | 12.6 | 87.4 | 2.25 | 11.5 | 11.5 |
| Comparative I | 25.2 | 74.8 | 4.50 | 23.0 | 92.0 |

$^a$Aged 3 days at 21° C.
$^b$Aged 3 days at 50° C.

These results compare $[V]_{eff}$ for coatings prepared from aged dispersions containing vanadium within the acceptable range, i.e., no greater than about 3.5 wt-%, to the $[V]_{eff}$ for a coating prepared from an aged dispersion having a high vanadium content, i.e., 4.5 wt-%. The dispersion having a 4.5% vanadium concentration is very viscous, and does not provide a very good coating. In fact, upon aging at 50° C. for 3 days, the dispersion became extremely viscous and produced a coating with a very large $[V]_{eff}$. Dispersions with 0.28%, 0.56%, or 2.25% vanadium concentrations are acceptable in that they provide good antistatic coatings. A dispersion containing 1.12% vanadium is the most acceptable and most preferred because it is capable of forming a coating with the lowest $[V]_{eff}$ of all those tested in Examples 16–19.

EXAMPLE 20

This Example demonstrates the preparation of a vanadium oxide colloidal dispersion with a surfactant. This Example also demonstrates the coating of various substrates.

A coating sol was prepared by adding 25.2 g deionized water and 0.3 g of a 10 wt-% aqueous surfactant (TRITON TM X-100, available from Rohm and Haas, Philadelphia, Pa.) solution to 4.5 g of a vanadium oxide colloidal dispersion containing 0.56 wt-% vanadium, prepared as described in Example 1. The coating sol was applied to a polyimide film (KAPTON TM, product of DuPont Company, Wilmington, Del.) by hand spreading using a No. 3 Mayer bar. The coating was dried at 130° C. for 5 minutes. The static decay time of the coated film was 0.01 second. The uncoated film did not exhibit static decay.

The coating sol was applied to paper (Type 696 White Bond Paper, available from 3M Office Systems Division, St. Paul, Minn.) by hand spreading using a No. 3 Mayer bar. The coating was dried at 100° C. for 5 minutes to give a sample with a static decay time of 0.01 second. The static decay time for the uncoated paper was 20 seconds.

This same coating sol was applied to polypropylene film, which had been pretreated by flame treating, by hand spreading using a No. 3 Mayer bar. The coating was dried at 100° C. for 5 minutes. The static decay time of the coated film was 0.01 second. The uncoated film did not exhibit static decay.

EXAMPLE 21

This Example demonstrates the preparation of a vanadium oxide colloidal dispersion with a surfactant and water-miscible cosolvent as additives. A dispersion was prepared by adding 15.5 g deionized water, 8.0 g isopropanol, 2.25 g diacetone alcohol, and 0.25 g of a 10% aqueous surfactant (TRITON TM X-100) solution to 4.5 g of a vanadium oxide colloidal dispersion containing 0.56 wt-% vanadium, prepared as described in Example 1. Samples of polymethylmethacrylate sheet (PLEXIGLAS TM G Acrylic Safety Glazing, product of Rohm and Haas Canada, Inc., West Hill, Ontario), polycarbonate sheet (LEXAN TM, product of General Electric Co., Cleveland, Ohio), and cellulose triacetate (product of the 3M Company, St. Paul, Minn.) each were coated with the dispersion by hand spreading using a No. 3 Mayer bar and dried at 100° C. for 5 minutes. The static decay times of the coated samples were:

polymethylmethacrylate: 0.02 second
polycarbonate: 0.06 second
cellulose triacetate: 0.07 second.

None of the uncoated samples exhibited static decay.

EXAMPLE 22

This Example demonstrates the preparation of a vanadium oxide colloidal dispersion by hydrolysis of $VO(O-i-Bu)_3$ in an aqueous polymer solution. $VO(O-i-Bu)_3$ (2.0 g, 0.0070 mol) was added to 96.2 g of an aqueous solution containing 12.2% polyacrylic acid (5000 MW, product of Polysciences, Inc., Warrington, Pa.) and 0.064% $H_2O_2$ (0.0018 mol). The mixture was stirred for 16 hours at room temperature to give a moderately viscous, homogeneous, dark brown sol. After aging for 4 days at room temperature, $[V]_{eff}$ for the colloidal dispersion was found to be 5.8 mg/m² as determined by the procedure of Example 1.

COMPARATIVE EXAMPLE II

In Comparative Example II, the compatibility of vanadium oxide colloidal dispersions with polyacrylic acid was investigated. A vanadium oxide colloidal dispersion prepared as described in Example 1 was diluted with deionized water to a colloidal dispersion containing 0.28% vanadium. When 1.5 g of the diluted colloidal dispersion was added to approximately 7.0 g of 1.0% 5000 MW polyacrylic acid, dark greenish brown clots immediately separated from the solution. When the 1.0% 5000 MW polyacrylic acid solution was added to the diluted vanadium oxide colloidal dispersion, a similar precipitation occurred. This Example shows that colloidal dispersions of vanadium oxide may be prepared in situ in solutions of polymers with which colloidally dispersed vanadium oxide is otherwise incompatible.

EXAMPLE 23

This Example demonstrates the preparation of a vanadium oxide colloidal dispersion by hydrolysis of $VO(O-i-Bu)_3$ in an aqueous polymer dispersion. Potassium persulfate (5.0 g of a 5% solution, 0.9 mmol, product of Mallinckrodt Chemical, St. Louis, Minn.), sodium metabisulfate (5.0 g of a 5% solution, 1.3 mmol, product of Matheson, Coleman, and Bell, Norwood, Ohio), and ferrous sulfate (1.0 g of a 1% solution, 0.04 mmol, product of Fischer Scientific, Fairlawn, N.J.) were added sequentially to a nitrogen purged mixture of 300 g of deionized water, 70.0 g methylmethacrylate (0.70 mol, product of Aldrich Chemical, Milwaukee, Wis.) and sodium lauryl sulfate (10.0 g of 10%, product of Aldrich Chemical, Milwaukee, Wis.) to give a colloidal dispersion of polymethyl methacrylate. The sodium lauryl sulfate is a stabilizer, while the potassium persulfate, sodium metabisulfate, and ferrous sulfate are redox initiators for the polymer emulsion. The dispersion was placed in dialysis tubing (12,000–14,000 molecular weight cutoff, product of American Scientific Products, McGaw Park, Ill.) and dialyzed against deionized water for four days to yield a dialyzed polymethylmethacrylate colloidal dispersion containing 11.9% solids by weight. $VO(O-i-Bu)_3$ (1.87 g, 6.5 mmol) was added to a mixture of 96.24 g of 11.9% dialyzed polymethylmethacrylate colloidal dispersion plus 1.87 g of 3.0% $H_2O_2$ to give a brownish, opaque dispersion. After ageing at 50° C. for three days, the dispersion was diluted and coated onto PVDC primed polyester film. $[V]_{eff}$ for the dispersion was 5.8 mg vanadium per m² of film.

EXAMPLE 24

This Example shows that reduction of $V^{5+}$ to $V^{4+}$ can be limited and $V^{4+}$ concentrations controlled by removing volatile reaction products through distillation subsequent to the hydrolysis reaction. A vanadium oxide colloidal dispersion was prepared as described in Example 1 except that 30 minutes after the addition of $VO(O-i-Bu)_3$ to the hydrogen peroxide solution, volatile reaction products (79.8 g) were removed by rotary evaporation at 50° C. The resulting colloidal dispersion was diluted with water to about 335 g and rotary evaporation repeated removing 156 g of volatile materials to give a colloidal dispersion containing about 1.5% vanadium. This was diluted and titrated with standard $KMnO_4$ as described in Example 1. A vanadium oxide colloidal dispersion containing 0.28% vanadium (90.0 g) was titrated with 2.79 mL of 0.0198 $KMnO_4$ solution and the supernatant liquid (90.0 g) was titrated with 1.27 mL of 0.0198 $KMnO_4$ solution. The concentration of $V^{4+}$ in the colloidal dispersion containing 0.28% vanadium was $1.6 \times 10^{-3}$ mole/kg. The mole fraction $V^{4+}$ ($V^{4+}$/total vanadium) was 0.030:1.0.

EXAMPLE 25

This Example demonstrates the preparation of a vanadium oxide colloidal dispersion in an acetone/water mixture. $VO(O-i-Bu)_3$ (6.30 g, 0.022 mol) was added to a rapidly stirring solution of 43.7 g (2.6 mol) deionized water in 50.0 g of acetone. The sample was stirred one day at room temperature and then aged at 50° C. for 3 days. $[V]_{eff}$ for the colloidal dispersion, determined as described in Example 1, was 5.8 mg/m².

EXAMPLE 26

This example demonstrates the preparation of an antistatic tape. Deionized water (91.3 g) and a 10% aqueous surfactant (Triton TM X-100) solution (1.0 g) were added to 7.5 g of colloidal vanadium oxide dispersion prepared as described in Example 1 to give a coating solution which contained 0.84% vanadium and 0.10% Triton TM X-100 surfactant. The coating solution was applied to Kapton TM film (product of Dupont Chemical Co., Wilmington, Del.) by hand spreading using a No. 3 Mayer bar. The resulting antistatic layer was dried at 120° C. for 1 minute. A primer solution containing 13.3% GE 1135-1 silicone, 0.7% GE SS4192C catalyst, 0.7% GESS4259C catalyst (products of General Electric Co., Waterford, N.Y.) and 85.3% toluene was applied on top of the vanadium oxide layer by hand spreading using a No. 12 Mayer bar and dried at 94° C. for 1 minute. Silicone adhesive (GE "Silgrip PSA 518," 54% solids polymethylphenyl siloxane, product of General Electric Co., Waterford, N.Y.) was coated onto the primed Kapton TM film by hand spreading using a No. 44 Mayer bar and dried at about 177° C. for 5 minutes. The resulting tape had a static decay time of 0.01 second (5000 V to 50 V decay, measured in downweb direction), 0 V charge upon unwind from the roll, and excellent adhesion between all layers. The properties of the tape were not affected by heating to about 240° C. for 5 minutes or 180° C. for 18 hours. A control tape without the vanadium oxide layer did not exhibit static decay and had greater than 5000 V potential upon unwind.

EXPERIMENT 27

This example demonstrates the preparation of an antistatic tape. An antistatic vanadium oxide layer was applied to Kapton TM film as described in Example 27. An adhesive solution containing 21.5 g of Dow Corning Q2-7406 (a silicone adhesive, 55% solids, product of Dow Corning Corp., Midland, Mich.), 10.72 g toluene, and 0.25 g benzoyl peroxide was applied on top of the antistatic layer by hand spreading using a No. 65 Mayer bar and dried at 160° C. for 5 minutes. The resulting tape had a static decay time of 0.01 second (5000 V to 50 V decay, measured in downweb direction) and excellent adhesion between all layers. The properties of the tape were not affected by heating to about 240° C. for 5 minutes or 180° C. for 18 hours.

EXAMPLE 28

This example demonstrates the preparation of an antistatic tape. An antistatic vanadium oxide layer was applied to Kapton TM film as described in Example 27. A solution containing 5% poly(vinyl N-octadecylcarbamate) in 20% xylene/80% toluene solution was coated over the $V_2O_5$ antistatic layer by hand spreading using a No. 12 Mayer bar and dried at 100° C. for 1 minute. The uncoated side of the film was coated with an adhesive solution containing 21.5 g of a silicon-based adhesive (commercially available under the trade designation "Q2-7406" (55% solids) from Dow Corning Corp., Midland, Mich.), 10.72 g toluene, and 0.25 g benzoyl peroxide by hand spreading using a No. 65 Mayer bar and dried at 160° C. for 5 minutes. The resulting tape had a static decay time of 0.01 second (5000 V to 50 V, measured in downweb direction). There was excellent adhesion of the coatings to a Kapton TM substrate.

EXAMPLE 29

This experiment was carried out to investigate the effect of changing salt concentration on the precipitation or flocculation of the sol. Salts were added at a concentration (measured in parts per million, ppm) to produce flocculation of the vanadium oxide sol in less than one minute. The amounts were calculated as parts per million of the salt based on the total amount of solution. The vanadium oxide sol was prepared as described in Example 1, and diluted to the concentrations (as weight percent vanadium oxide) shown in the table.

TABLE 2

Ion Effect on Flocculation of the Dispersion

| Salt | Disper.Conc.: 0.075% | 0.15% | 0.30% | 0.60% |
|---|---|---|---|---|
| NaOAc | 700 | 700 | 800 | 800 |
| $Na_4.EDTA$ | 1200 | 1250 | 1100 | 900 |
| $NaNO_3$ | 400 | 500 | 400 | 400 |
| $AgNO_3$ | 130 | 160 | 190 | 180 |
| $Mg(NO_3)_2$ | 40 | 50 | 70 | 70 |
| $Ca(NO_3)_2$ | 30 | 60 | 60 | 60 |
| $Fe(NO_3)_3$ | 70 | 90 | 90 | 80 |

This indicates that the sols are much less stable in the presence of the divalent ions such as $Mg^{2+}$, $Ca^{2+}$, or $Fe^{2+}$ and much more tolerant to the presence of $Na^+$ ions. Hence, the sols could be prepared in "softened" water. The deionized water used in the methods of the present invention typically had a total cation content of less than 50 parts per million.

COMPARATIVE EXAMPLE

This Example demonstrates the preparation of $V_2O_5$ dispersions according to U.S. Pat. No. 4,203,769. $V_2O_5$ (15.6 g, 0.086 mol, product of Aldrich, Milwaukee, Wis.) was heated in a covered platinum crucible for 10 minutes at 1100° C. and then poured into 487 g of rapidly stirring deionized $H_2O$. The resulting liquid plus gelatinous black precipitate was warmed to 40°–45° C. for 10 minutes and allowed to stir for 1 hour at room temperature to give a soft, thixotropic black gel which was diluted with 277 g deionized $H_2O$ to give a vanadium oxide colloidal dispersion containing 1.1% vanadium. The viscous colloidal dispersion was filtered to remove undispersed $V_2O_5$ and then aged at 50° C. for 6 days. The value of $[V]_{eff}$ of the colloidal dispersion prepared in this manner was 1.4 mg/m$^2$.

The concentration of $V^{4+}$ in the colloidal dispersion was determined by titration with permanganate as described in Example 1. The vanadium oxide colloidal dispersion (90.0 g, containing 0.28% vanadium) was acidified and titrated with 5.05 mL of 0.0198M $KMnO_4$ solution. The supernatant liquid (90.0 g) was titrated, after acidification with 0.90 mL of 0.0198M $KMnO_4$ solution. The concentration of $V^{4+}$ in the colloidal dispersion containing 0.28% vanadium was $4.5 \times 10^{-3}$ mole/kg. The mole fraction of $V^{4+}$ ($V^{4+}$/total vanadium) was 0.083.

A coating with a calculated surface vanadium concentration of 2.88 mg/m$^2$ (prepared by coating the vanadium oxide colloidal dispersion containing 0.042% vanadium onto PVDC primed polyester film by hand spreading using a No. 3 Mayer bar) was evaluated by field emission scanning electron microscopy. This showed that the coating consisted of evenly dispersed, whisker-shaped colloidal particles of vanadium oxide, approximately 0.01–0.05 micrometer wide and 1.0–2.0 micrometers long. The aspect ratio was approximately 25 to 120 as measured by FESEM.

This Example shows that solutions prepared according to U.S. Pat. No. 4,203,769 (Guestaux) have similar properties to those prepared by the alkoxide process of the present invention; however, the former process is disadvantageous because of the need for special containers, the generation of highly toxic $V_2O_5$ fumes by heating to high temperatures, and the difficulty in filtering out nondispersed $V_2O_5$. Furthermore, the concentration of $V^{4+}$ is not easily controlled as it is for the present invention. Also, the $V^{4+}$/total vanadium ratio is limited to less than about 0.1, whereas by the process of the present invention, variable ratios up to and over 0.3 are possible.

COMPARATIVE EXAMPLE IV

This Example demonstrates the preparation of a vanadium oxide colloidal dispersion by an ion exchange process. Sodium metavanadate (6.0 g, 0.049 mol, product of Alfa Products, Ward Hill, Mass.) was dissolved by warming in 144 g deionized $H_2O$. The resulting solution was filtered to remove insoluble material. The filtered solution was pumped through a 15 mm × 600 mm chromatography column containing 600 mL of AMBERLITE ™ IR 120 Plus (H+) (available from Aldrich Chemical, Milwaukee, Wis.) to give a light orange solution containing 1.7% vanadium. The solution became a soft opaque brick red gel upon standing at room temperature for 24 hr. After aging for 9 days at room temperature, the sample was diluted to give a hazy orange-red colloidal dispersion containing 0.17% vanadium. The value of $[V]_{eff}$ for the colloidal dispersion, determined as described in Example 1, was 23.0 mg/m$^2$.

The concentration of $V^{4+}$ in the colloidal dispersion was determined by titration with permanganate as described in Example 1. The vanadium oxide colloidal dispersion (125.0 g, containing 0.17% vanadium) was acidified and titrated with 0.30 mL of 0.0206M KMnO$_4$ solution. The supernatant liquid (125.0 g) was titrated, after acidification, with 0.05 mL of 0.0206M KMnO$_4$ solution. The concentration of $V^{4+}$ in the colloidal dispersion containing 0.17% vanadium was $2.06 \times 10^{-4}$ mole/kg. The mole fraction of $V^{4+}$ ($V^{4+}$/total vanadium) was 0.006.

A coating with a calculated surface vanadium concentration of 2.88 mg/m$^2$ (prepared by coating a diluted vanadium oxide colloidal dispersion containing 0.042% vanadium onto PVDC primed polyester film by hand spreading using a No. 3 Mayer bar) was evaluated by field emission scanning electron microscopy. This showed that the coating consisted of clumped whisker-shaped colloidal particles of V$_2$O$_5$, approximately 0.02-0.08 micrometer wide and 0.7-1.7 micrometers long. The aspect ratio was approximately 4 to 25 as measured by FESEM.

This Example shows that solutions prepared by an ion exchange process are much less effective for the preparation of antistatic coatings than the colloidal dispersions of the present invention.

COMPARATIVE EXAMPLE V

This Example demonstrates the preparation of a vanadium oxide colloidal dispersion by thermohydrolysis of VOCl$_3$. Vanadium oxytrichloride (5.72 g, 0.017 mol, product of Aldrich Chemical Co. Milwaukee, Wis., used as received) was added via a syringe to 144.3 g deionized H$_2$O to give a light orange colored solution. This was heated to 85°-95° C. for approximately 30 minutes to give a hazy orange-red colloidal dispersion containing 1.1% vanadium. The colloidal dispersion was centrifuged at 5050×g to give a brick red gelatinous solid and a clear water white supernatant liquid. The solid was redispersed in deionized water to give 150 g of colloidal dispersion. The steps of centrifuging and redispersing were repeated 5 more times to give a vanadium oxide colloidal dispersion containing 1.1% vanadium. The value of $[V]_{eff}$ for the colloidal dispersion was found to be 46 mg/m$^2$ by the procedure described in Example 1.

A coating with a calculated surface vanadium concentration of 2.88 mg/m$^2$ (prepared by coating a diluted vanadium oxide colloidal dispersion containing 0.042% vanadium onto PVDC primed polyester film by hand spreading using a No. 3 Mayer bar) was evaluated by field emission scanning electron microscopy. This showed that the coating consisted of isolated aggregates about 2-3 micrometers in diameter. Each aggregate consisted of whisker-shaped colloidal particles of vanadium oxide approximately 0.02-0.08 micrometer wide and about 0.3-1.3 micrometers long. The aspect ratio was approximately 1.5 to 3.0 as measured by FESEM.

This Example shows that sols prepared by the thermohydrolysis of VOCl$_3$ are much less effective for the preparation of antistatic coatings than the colloidal dispersions of the present invention.

COMPARATIVE EXAMPLE VI

This Example demonstrates the preparation of a vanadium oxide colloidal dispersion by the reaction of V$_2$O$_5$ with H$_2$O$_2$. Hydrogen peroxide (30%, 20.0 g, 0.176 mol) was added to a crystalline V$_2$O$_5$ (2.00 g, 0.011 mol, product of Aldrich Chemical Co., Milwaukee, Wis., used as received) suspended in 78.1 g of rapidly stirring deionized water. A vigorous reaction was observed with the evolution of a gas and warming of the reaction mixture. After stirring overnight at room temperature the product was a hazy, orange-brown colloidal dispersion. This colloidal dispersion was heated to 90° C. for 75 minutes. $[V]_{eff}$ was found to be 11.5 mg/m$^2$ by the method described in Example 1.

A coating with a calculated surface vanadium concentration of 2.88 mg/m$^2$ (prepared by coating a diluted vanadium oxide colloidal dispersion containing 0.042% vanadium onto PVDC primed polyester film by hand spreading using a No. 3 Mayer bar) was evaluated by field emission scanning electron microscopy. This showed that the coating consisted of well dispersed whisker shaped colloidal particles of vanadium oxide, approximately 0.01-0.08 micrometer wide, and about 0.3-1.2 micrometers long. The aspect ratio was approximately 7 to 18 as measured by FESEM.

This Example shows that solutions prepared by the reaction of V$_2$O$_5$ with H$_2$O$_2$ are much less effective for the preparation of antistatic coatings than the colloidal dispersions of the present invention prepared from vanadium oxide trialkoxides.

COMPARATIVE EXAMPLE VII

This Example demonstrates the preparation of a vanadium oxide colloidal dispersion according to the procedure reported by C. Sanchez et al. in *Mat. Res. Soc. Symp. Proc.*, 121, 93 (1988), the disclosure of which is incorporated herein by reference. VO(O-t-Amyl)$_3$ (1.00 g, 3.04 mmol) was added to rapidly stirring deionized water (6.00 g) to give a light yellow aqueous solution plus a yellow oil. The yellow oil disappeared as the aqueous phase became deep red in color. The mixture became homogeneous in about 6 minutes. After stirring for 15 minutes, the reaction product was homogeneous and deep red with a vanadium content of 2.2%. The value of $[V]_{eff}$ for this colloidal dispersion was found to be 23.0 mg/m$^2$ by the method described in Example 1. The sample was allowed to age at 21° C. overnight to give a gelatinous, thixotropic deep red-brown colloidal dispersion. The value of $[V]_{eff}$ for this aged colloidal dispersion was found to be 11.5 mg/m$^2$. This Example shows that colloidal dispersions prepared by the method of Sanchez et al. are much less effective for the preparation of antistatic coatings than the colloidal dispersions of the present invention prepared from vanadium oxide trialkoxides.

EXAMPLE 30

This Example illustrates the preparation of a vanadium oxide colloidal dispersion using tap water. A vanadium oxide colloidal dispersion was prepared by adding VO(O-i-Bu)$_3$ (15.8 g, 0.055 mol, product of Akzo Chemicals, Inc, Chicago, Ill.) to rapidly stirring water (234.4 g), giving a solution with a vanadium concentration of 0.22 mole/kg (1.1% vanadium). Upon addition of VO(O-i-Bu)$_3$, the mixture became dark reddish brown. This colloidal dispersion was stirred for about 18 hours to provide a homogeneous dispersion. It was transferred to a polyethylene bottle and aged in a constant temperature bath at 50° C. for 4 days to give a dark brown thixotropic gelatinous colloidal dispersion (i.e., a colloidal dispersion in which the dispersed phase has combined to produce a semi-solid material with a three-dimensional solid network containing a large volume of interconnecting pores filled with a liquid).

Portions of the vanadium oxide colloidal dispersion, containing 1.1% vanadium, were diluted with deionized H$_2$O to provide colloidal dispersions with 0.17, 0.084, and 0.042% vanadium. Each diluted dispersion was coated by hand spreading using a No. 3 Mayar bar onto PVDC primed polyester to produce vanadium oxide coatings with calculated surface vanadium concentrations of 11.5, 5.76, and 2.88 mg/m$^2$, respectively. The static decay times for decay of a 5000 V potential to less than 50 V were measured for each of these coatings (0.01, 0.06, and 0.25 seconds, respectively), and the value of $[V]_{eff}$ was determined to be 5.76 mg/m$^2$.

The invention has been described with reference to various specific and preferred embodiments and techniques. It should be understood, however, that many variations and modifications can be made while remaining within the spirit and scope of the invention.

What is claimed is:

1. A process for the preparation of a vanadium oxide colloidal dispersion, said process comprising the steps of:
    a) providing a vanadium oxide colloidal dispersion containing about 0.15 wt-% to about 2 wt-% vanadium wherein the vanadium oxide is provided by hydrolyzing vanadium oxoalkoxide with an excess of water; and
    b) aging said dispersion containing about 0.15 wt-% to about 2 wt-% vanadium a sufficient mount to produce a colloidal dispersion usable to produce an antistatic coating with a value of $[V]_{eff}$ of less than about 12 mg/m$^2$.

2. The process of claim 1 wherein said dispersion is aged at a temperature of about 40°–90° C. for about 8 hours to about 14 days.

3. The process of claim 1 wherein said colloidal dispersion is usable to produce an antistatic coating with a value of $[V]_{eff}$ of less than about 6 mg/m$^2$.

4. The process of claim 3 wherein said colloidal dispersion is usable to produce an antistatic coating with a value of $[V]_{eff}$ of less than about 3 mg/m$^2$.

5. The process of claim 1 wherein said excess of water includes about 0.25–1 mole of a hydroperoxide per mole of vanadium initially present.

6. The process of claim 1 wherein said excess of water includes a water-miscible organic solvent selected from the group consisting of a low molecular weight ketone, an alcohol, and combinations thereof.

7. The process of claim 1 further including a step of preparing vanadium oxoalkoxide by combining an alcohol and a vanadium oxide precursor species selected from the group consisting of a vanadium oxyhalide, a vanadium oxyacetate, and combinations thereof.

8. The process of claim 1 wherein the water is deionized water.

9. A colloidal dispersion prepared according to the process of claim 1.

10. A process for the preparation of a vanadium oxide colloidal dispersion, said process comprising the steps of:
    a) providing a vanadium oxide colloidal dispersion containing about 0.15 wt-% to about 2 wt-% vanadium wherein the vanadium oxide is provided by hydrolyzing vanadium oxoalkoxide with an excess of water containing an effective mount of a hydroperoxide; and
    b) aging said dispersion containing about 0.15 wt-% to about 2 wt-% vanadium a sufficient mount to produce a colloidal dispersion usable to produce an antistatic coating with a value of $[V]_{eff}$ of less than about 2 mg/m$^2$.

11. The process of claim 10 wherein said excess of water includes about 0.25–1 mole of a hydroperoxide per mole of vanadium initially present.

12. The process of claim 10 wherein said dispersion is aged at a temperature of about 40°–90° C. for about 8 hours to about 14 days.

13. The process of claim 12 wherein said dispersion is aged at a temperature of about 50°–60° C. for about 4–8 days.

14. The process of claim 10 wherein the water is deionized water.

15. A process for the preparation of a polymeric vanadium oxide colloidal dispersion, said process comprising the steps of:
    a) providing a polymeric vanadium oxide colloidal dispersion containing about 0.15 wt-% to about 2 wt-% vanadium wherein the vanadium oxide is provided by hydrolyzing vanadium oxoalkoxide with an excess of water in the presence of at least one of an organic polymer and prepolymer; and
    b) aging said dispersion containing about 0.15 wt-% to about 2 wt-% vanadium a sufficient mount to produce a colloidal dispersion usable to produce an antistatic coating with a value of $[V]_{eff}$ of less than about 12 mg/m$^2$.

16. The process of claim 15 wherein said dispersion is aged at a temperature of about 40°–90° C. for about 8 hours to about 14 days.

17. The process of claim 15 wherein said excess of water includes about 0.25–1 mole of a hydroperoxide per mole of vanadium initially present.

18. The process of claim 15 wherein said excess of water includes a water-miscible organic solvent selected from the group consisting of a low molecular weight ketone, an alcohol, and combinations thereof.

19. The process of claim 15 wherein the water is deionized water.

20. A colloidal dispersion prepared according to the process of claim 15.

21. A process for the preparation of a polymeric vanadium oxide colloidal dispersion, said process comprising the steps of:
    a) providing a polymeric vanadium oxide colloidal dispersion containing about 0.15 wt-% to about 2 wt-% vanadium wherein the vanadium oxide is provided by hydrolyzing vanadium oxoalkoxide with an excess of water containing an effective mount of a hydroperoxide in the presence of at least one of an organic polymer and prepolymer; and
    b) aging said dispersion containing about 0.15 wt-% to about 2 wt-% vanadium a sufficient amount to produce a colloidal dispersion usable to produce an antistatic coating with a value of $[V]_{eff}$ of less than about 2 mg/m$^2$.

22. The process of claim 21 wherein said excess of water includes about 0.25–1 mole of a hydroperoxide per mole of vanadium initially present.

23. The process of claim 21 wherein the water is deionized water.

24. The process of claim 21 wherein said dispersion is aged at a temperature of about 40°–90° C. for about 8 hours to about 14 days.

25. A process for the preparation of an antistatic coating, said process comprising the steps of:
   a) providing a vanadium oxide colloidal dispersion containing about 0.15 wt-% to about 2 wt-% vanadium wherein the vanadium oxide is provided by hydrolyzing vanadium oxoalkoxide with an excess of water;
   b) aging said dispersion containing about 0.15 wt-% to about 2 wt-% vanadium a sufficient amount to produce a colloidal dispersion usable to produce an antistatic coating with a value of $[V]_{eff}$ of less than about 12 mg/m$_2$; and
   c) coating said vanadium oxide colloidal dispersion of step (b) on a substrate to form an antistatic coating.

26. The process of claim 25 wherein said dispersion is aged at a temperature of about 40°–90° C. for about 8 hours to about 14 days.

27. The process of claim 25 wherein said excess of water includes about 0.25–1 mole of a hydroperoxide per mole of vanadium initially present.

28. The process of claim 25 wherein said excess of water includes at least one of an organic polymer and prepolymer.

29. The process of claim 25 wherein the water is deionized water.

30. An antistatic coating prepared by the process of claim 25.

31. A process for the preparation of an antistatic coating, said process comprising the steps of:
   a) providing a vanadium oxide colloidal dispersion containing about 0.15 wt-% to about 2 wt-% vanadium wherein the vanadium oxide is provided by hydrolyzing vanadium oxoalkoxide with an excess of water containing an effective amount of a hydroperoxide;
   b) aging said dispersion containing about 0.15 wt-% to about 2 wt-% vanadium a sufficient mount to produce a colloidal dispersion usable to produce an antistatic coating with a value of $[V]_{eff}$ of less than about 2 mg/m$^2$; and
   c) coating said vanadium oxide colloidal dispersion of step (b) on a substrate to form an antistatic coating.

32. The process of claim 31 wherein said dispersion is aged at a temperature of about 40°–90° C. for about 8 hours to about 14 days.

33. The process of claim 31 wherein said excess of water includes about 0.25–1 mole of a hydroperoxide per mole of vanadium initially present.

34. The process of claim 31 wherein the water is deionized water.

35. An antistatic coating prepared by the process of claim 31.

* * * * *

UNITED STATES PATENT AND TRADEMARK OFFICE
CERTIFICATE OF CORRECTION

PATENT NO.     : 5,407,603
DATED          : April 18, 1995
INVENTOR(S)    : Morrison It is certified that error appears in the above-identified patent and that said Letters Patent is hereby corrected as shown below:

<u>Title page, Item [54] and Column 1, line 2,</u>
"DISPERSONS" should be -- DISPERSIONS --.

Item [56], OTHER PUBLICATIONS, 1$^{st}$ reference, "aval." should be -- avail. --.

<u>Column 2, line 62, to Column 3, line 11,</u>
Should read:

--The present invention provides, a process for the preparation of a vanadium oxide colloidal dispersion, the process comprising the steps of:

(a) hydrolyzing vanadium oxoalkoxide with an excess of water to form a vanadium oxide colloidal dispersion containing about 0.15 wt-% to about 2 wt-% (preferably, about 0.3 wt-% to about 2 wt-%, more preferably, about 0.6 wt-% to about 1.7 wt-%, and most preferably, about 0.6 wt-% to about 1.1 wt-%) vanadium; and (b) aging the dispersion.

Herein, these weight percentages are calculated from the amount of vanadium in the vanadium oxoalkoxide starting material, and are based on the total weight of the dispersion.

By an "excess" of water, it is meant that a sufficient amount of water is present relative to the amount of vanadium oxoalkoxide such that there is greater than 1 equivalent of water per equivalent of vanadium oxoalkoxide. That is, there is greater than a 1:1 molar ratio of water to vanadium-bound alkoxide ligands.

"Aging" means the dispersion is given sufficient time for vanadium oxide fibrils to form such that the dispersion is capable of providing a $[V]_{eff}$, mg of vanadium per $m^2$, of less than 12 mg/$m^2$, which is the calculated surface concentration of vanadium required to provide an electrostatic charge decay time of less than 0.1 seconds for decay of a 5000 V potential to less than 50 V. The surface concentration of vanadium in a coating of the dispersion can be calculated from: (1) formulation data, assuming 100% conversion of the vanadium oxoalkoxide to the vanadium oxide colloidal dispersion, and also assuming

UNITED STATES PATENT AND TRADEMARK OFFICE
CERTIFICATE OF CORRECTION

PATENT NO. : 5,407,603
DATED : April 18, 1995
INVENTOR(S) : Morrison

It is certified that error appears in the above-identified patent and that said Letters Patent is hereby corrected as shown below:

the density of each successively diluted vanadium oxide colloidal dispersion is that of water ( 1 g/mL); and (2) the wet coating thickness of the dilute dispersion applied using a No. 3 Mayer Bar is 6.9 micrometers. Further details regarding the measurement of $[V]_{eff}$ can be found in Example 1.

Preferably, $[V]_{eff}$ is less than about 6 mg/m$^2$, more preferably less than about 3 mg/m$^2$, and most preferably less than about 2 mg/m$^2$. Generally, lower surface concentrations of vanadium are desired because lower coating weights of vanadium oxide tend to be less colored, more transparent, more uniform, and in certain circumstances possess better adhesion properties than high coating weights of vanadium oxide.

In another aspect, the present invention provides a process for the preparation of a vanadium oxide colloidal dispersion, the process comprising the steps of:

(a)  providing a vanadium oxide colloidal dispersion containing about 0.15 wt-% to about 2 wt-% (preferably, about 0.3 wt-% to about 2 wt-%, more preferably, about 0.6 wt-% to about 1.7 wt-%, and most preferably, about 0.6 wt-% to about 1.1 wt-%) vanadium, wherein the vanadium oxide is provided by hydrolyzing vanadium oxoalkoxide with an excess of water; and (b)  aging the dispersion.

The dispersion of step (a) can be provided, for example, by hydrolyzing vanadium oxoalkoxide with an excess of water such that the concentration of vanadium is greater than about 2 wt-%., and then diluting the colloidal vanadium oxide dispersion. Preferably, the undiluted colloidal vanadium oxide dispersion contains no greater than about 4 wt-% (preferably, no greater than about 3.5 wt-%) vanadium. Such dispersion containing greater than about 4 wt-% vanadium are typically too viscous for ease of handling.

UNITED STATES PATENT AND TRADEMARK OFFICE
CERTIFICATE OF CORRECTION

PATENT NO. : 5,407,603
DATED : April 18, 1995
INVENTOR(S) : Morrison

It is certified that error appears in the above-identified patent and that said Letters Patent is hereby corrected as shown below:

In yet another aspect, the present invention provides a process for the preparation of a polymeric vanadium oxide colloidal dispersion, the process comprising the steps of:

(a) hydrolyzing vanadium oxoalkoxide in an amount of water sufficient to form a vanadium oxide colloidal dispersion containing about 0.15 wt-% to about 2 wt-% (preferably, about 0.3 wt-% to about 2 wt-%, more preferably, about 0.6 wt-% to about 1.7 wt-%, and most preferably, about 0.6 wt-% to about 1.1 wt-%) vanadium, in the presence of at least one of an organic polymer and prepolymer to form a polymeric vanadium oxide colloidal dispersion; and (b) aging the dispersion.

In yet another aspect, the present invention provides a process for the preparation of a polymeric vanadium oxide colloidal dispersion, the process comprising the steps of:

(a) providing a polymeric vanadium oxide colloidal dispersion containing about 0.15 wt-% to about 2 wt-% (preferably, about 0.3 wt-% to about 2 wt-%, more preferably, about 0.6 wt-% to about 1.7 wt-%, and most preferably, about 0.6 wt-% to about 1.1 wt-%) vanadium, wherein the vanadium oxide is provided by hydrolyzing vanadium oxoalkoxide with an excess of water in the presence of at least one of an organic polymer and prepolymer; and (b) aging the dispersion.

In yet another aspect, the present invention provides a process for the preparation of an antistatic coating, the process comprising the steps of:

(a) hydrolyzing vanadium oxoalkoxide with an excess of water to form a vanadium oxide colloidal dispersion containing about 0.15 wt-% to about 2 wt-% (preferably, about 0.3 wt-% to about 2 wt-%, more preferably, about 0.6 wt-% to about 1.7 wt-%, and most preferably, about 0.6 wt-% to about 1.1 wt-%) vanadium;

UNITED STATES PATENT AND TRADEMARK OFFICE
CERTIFICATE OF CORRECTION

PATENT NO. : 5,407,603
DATED : April 18, 1995
INVENTOR(S) : Morrison

It is certified that error appears in the above-identified patent and that said Letters Patent is hereby corrected as shown below:

(b)   aging said dispersion; and (c)   coating said vanadium oxide colloidal dispersion of step (b) on a substrate to form an antistatic coating.

In yet another aspect, the present invention provides a process for the preparation of an antistatic coating, the process comprising the steps of:

(a)   providing a vanadium oxide colloidal dispersion containing about 0.15 wt-% to about 2 wt-% (preferably, about 0.3 wt-% to about 2 wt-%, more preferably, about 0.6 wt-% to about 1.7 wt-%, and most preferably, about 0.6 wt-% to about 1.1 wt-%) vanadium, wherein the vanadium oxide is provided by hydrolyzing vanadium oxoalkoxide with an excess of water;

(b)   aging the dispersion; and (c)   coating the vanadium oxide colloidal dispersion of step (b) on a substrate to form an antistatic coating.

Although the formation and aging of vanadium oxide may be described herein as two steps, it is to be understood that aging of formed vanadium oxide can occur while hydrolysis of the vanadium oxoalkoxide is proceeding.

Hydrolysis of vanadium oxoalkoxides under appropriate conditions gives vanadium oxide colloidal dispersions that are exceptionally useful precursors for antistatic coatings. Preferred vanadium oxide colloidal dispersions prepared by the methods of the present invention are characterized by: high aspect ratio colloidal particles, as observed in the final coating state by field emission scanning electron microscopy; and well-dispersed particles, i.e., not unacceptably agglomerated or flocculated particles. They may also be characterized by an effective concentration of vanadium(IV) ions, which are believed to be a source of mobile electrons in the quantum mechanical small polaron hopping mechanism.--

Column 4,
Lines 51-62, should read:

-- In preferred dispersions according to the present invention, the ratio of $V^{4+}$ ions to the total concentration of vanadium ions, i.e., $V^{4+} + V^{5+}$ ions, is at least about 0.01:1, preferably at least about 0.05:1, and more preferably at least about 0.3:1. --

UNITED STATES PATENT AND TRADEMARK OFFICE
CERTIFICATE OF CORRECTION

PATENT NO. : 5,407,603
DATED : April 18, 1995
INVENTOR(S) : Morrison

It is certified that error appears in the above-identified patent and that said Letters Patent is hereby corrected as shown below:

Column 7, line 49 through Column 8, line 28, should be deleted.

Column 8,
Line 49, "VOH" should be -- V-OH --.
Line 58, "1.7" should be -- 1.1 --.

Column 10, line 29 through Column 10, line 32,
Should read
  --better dispersed. Preferably, the excess of water includes about 0.25 to about 1 mole of a hydroperoxide vanadium per mole of vanadium initially present.
      While not wishing to be held to any particular--.

Column 11, line 5 through Column 11, line 25,
Should read:
  --It is believed that dispersions which have very low concentrations of vanadium will not promote the growth of vanadium oxide fibrils. These fibrils form a network when the dispersion is coated out and is believed to be necessary for the production of an effective antistatic coating. The aging of these dispersions within the specified concentration ranges is believed to be less dependent on the concentration than it is on the temperature of the aging. At concentrations above the specified ranges, the fibrils form, but tend to provide dispersions that are difficult to dilute (i.e., redisperse), and hence such dispersions are not very useful for antistatic coatings.
      Aging typically involves storing the solution in a constant temperature bath until a thixotropic colloidal dispersion is formed. Aging can be conducted, for example, for about 8 hours to many weeks, depending upon the temperature. Aging of the dispersion at 20°C, for example, may take as long as about 4 months. Aging at 90°C, however, can be carried out in about 8 hours. High aging temperatures, such as 90°C, may cause evaporative loss of water from the dispersion making accurate concentration determination difficult, making handling and dilution more difficult, and may result in greater polydispersity of the colloidal vanadium oxide fibrils. Further, over aging the dispersion can degrade the effectiveness of the dispersion for preparing antistatic coatings (i.e., $[V]_{eff}$ increases).
      Preferably, the dispersions are aged at a temperature in the range from about 40°C to about 90°C for about 8 hours to about 14 days. More preferably, the dispersions are aged at a temperature in the range from about 50°C to about 60°C for about 4 to about 8 days. These temperatures are preferred because they are convenient to use and allow production of useful coatings within a reasonable period of time. The time for aging at the specified temperatures is believed to provide the best dispersions in terms of providing a desirable antistatic coating with the lowest possible concentrations of vanadium.--

UNITED STATES PATENT AND TRADEMARK OFFICE
CERTIFICATE OF CORRECTION

PATENT NO.   : 5,407,603
DATED        : April 18, 1995
INVENTOR(S)  : Morrison

It is certified that error appears in the above-identified patent and that said Letters Patent is hereby corrected as shown below:

Column 13,
Line 35, "EXPERIMENTAL EXAMPLES" should be -- Examples --.

Column 14,
Line 66, "0.90M" should be -- concentrated --.

Column 15,
Line 2, "$Mn_{2+}$" should be -- $Mn^{2+}$ --.
Line 9, "$Al_2(SO_4)_3\text{-}\bullet 16H_2O$" should be -- $Al_2(SO_4)_3\bullet 16H_2O$ --.
Line 51, "$m_3$" should be -- $m^3$ --.

Column 16,
Line 45, "EXAMPLES 3-12" should be -- EXAMPLES 9-12 --.

Column 20,
Line 7, "ageing" should be -- aging --.
Line 33, "0,030:1.0" should be -- 0.030:1.0 --.

Column 21,
Line 9, "EXPERIMENT 27" should be -- EXAMPLE 27 --.
Line 30, "5%" should be -- 57% --.

Column 22,
Line 9, "COMPARATIVE EXAMPLE" should be
-- COMPARATIVE EXAMPLE III --.

Column 26,
Line 10, "mount" should be -- amount --.
Line 13, "mount" should be -- amount --.
Line 64, "mount" should be -- amount --.

UNITED STATES PATENT AND TRADEMARK OFFICE
CERTIFICATE OF CORRECTION

PATENT NO. : 5,407,603
DATED : April 18, 1995
INVENTOR(S) : Morrison

It is certified that error appears in the above-identified patent and that said Letters Patent is hereby corrected as shown below:

Column 28,
Line 6, "coating prepared" should be -- coating composition prepared --.
Line 31, "coating prepared" should be -- coating composition prepared --.

Signed and Sealed this

Fifteenth Day of April, 2003

JAMES E. ROGAN
*Director of the United States Patent and Trademark Office*